(12) United States Patent
Tanaka

(10) Patent No.: US 11,846,764 B2
(45) Date of Patent: Dec. 19, 2023

(54) ZOOM LENS, IMAGING OPTICAL DEVICE, AND DIGITAL APPARATUS

(71) Applicant: Konica Minolta, Inc., Tokyo (JP)

(72) Inventor: Hiroaki Tanaka, Sakai (JP)

(73) Assignee: KONICA MINOLTA, INC., Tokyo (JP)

(\*) Notice: Subject to any disclaimer, the term of this patent is extended or adjusted under 35 U.S.C. 154(b) by 12 days.

(21) Appl. No.: 17/658,591

(22) Filed: Apr. 8, 2022

(65) Prior Publication Data

US 2022/0365327 A1   Nov. 17, 2022

(30) Foreign Application Priority Data

May 12, 2021  (JP) ................................ 2021-080854

(51) Int. Cl.
  *G02B 15/14* (2006.01)
  *G02B 13/18* (2006.01)

(52) U.S. Cl.
  CPC .......... *G02B 15/1461* (2019.08); *G02B 13/18* (2013.01)

(58) Field of Classification Search
  CPC ..... G02B 15/1461; G02B 13/18; G02B 15/22
  USPC ................................... 359/758, 752
  See application file for complete search history.

(56) References Cited

U.S. PATENT DOCUMENTS

| 2010/0194928 | A1* | 8/2010 | Amanai ............ G02B 15/1461 359/683 |
| 2013/0021674 | A1* | 1/2013 | Fujikura ........... G02B 15/1461 359/683 |
| 2016/0349492 | A1* | 12/2016 | Maetaki ........... G02B 15/1461 |

FOREIGN PATENT DOCUMENTS

| JP | 2014-106243 A | 6/2014 |
| JP | 2016-109720 A | 6/2016 |

\* cited by examiner

*Primary Examiner* — George G. King
(74) *Attorney, Agent, or Firm* — LUCAS & MERCANTI, LLP

(57) ABSTRACT

A zoom lens includes, in order from an object side: a first lens group having positive power; a second lens group having negative power; a third lens group having positive power; a fourth lens group having positive power; a fifth lens group having negative power; and a sixth lens group having positive power. The fourth lens group includes at least one positive lens that satisfies a conditional formula of vdp≥65. A conditional formula of 1.19≤f3/ft≤4.15 and a conditional formula of 0.51≤f4/ft≤1.50 are satisfied.

7 Claims, 13 Drawing Sheets

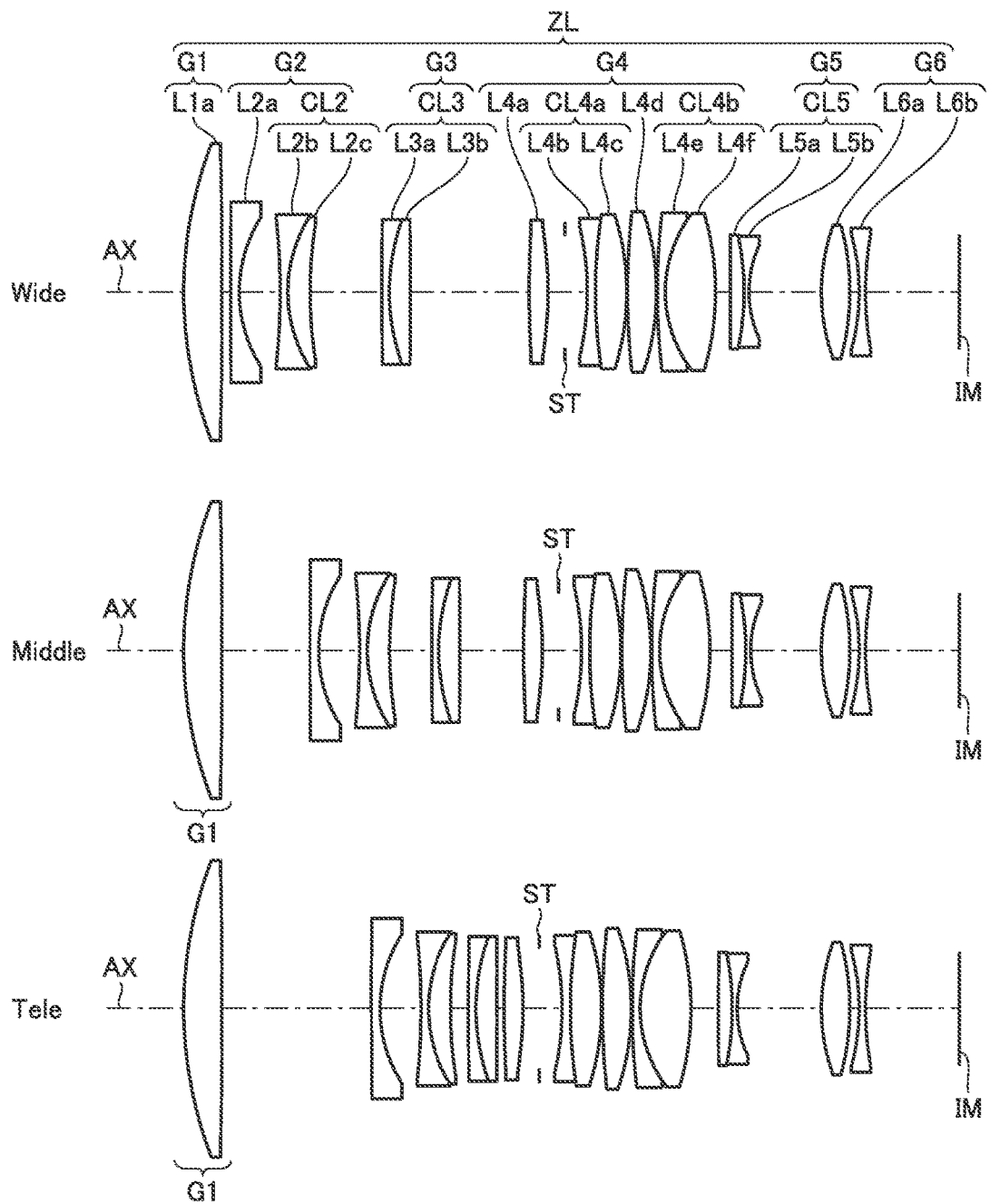

ZOOM LENS, IMAGING OPTICAL DEVICE, AND DIGITAL APPARATUS

The entire disclosure of Japanese Patent Application No. 2021-080854, filed on May 12, 2021, is incorporated herein by reference in its entirety.

BACKGROUND

Technological Field

The present disclosure relates to a zoom lens, an imaging optical device, and a digital apparatus.

Description of the Related Art

Japanese Laid-Open Patent Publication Nos. 2014-106243 and 2016-109720 each disclose a zoom lens including, in order from the object side: a first lens group having positive power; a second lens group having negative power; a third lens group having positive power; a fourth lens group having negative power; and a fifth lens group having positive power.

SUMMARY

In recent years, zoom lenses have been increasingly strongly demanded to achieve not only high resolving power but also brightness comparable to that achieved by a unifocal lens. Japanese Laid-Open Patent Publication Nos. 2014-106243 and 2016-109720 each disclose a zoom lens having an F-number of about 2.8. In this case, each of the zoom lenses disclosed in Japanese Laid-Open Patent Publication Nos. 2014-106243 and 2016-109720 is formed of five lens groups. Thus, the smaller the F-number of the zoom lens is, the larger the variations in spherical aberration and comatic aberration become due to zooming, which makes it difficult to excellently correct aberrations in the entire zooming area.

The present disclosure has been made in view of the above-described problems, and an object of the present disclosure is to provide: a zoom lens that has a smaller F-number in an entire zooming area and allows excellent correction of aberration; an imaging optical device including the zoom lens; and a digital apparatus.

To achieve at least one of the above-mentioned objects, according to an aspect of the present invention, a zoom lens reflecting one aspect of the present invention comprises, in order from an object side to an image surface side: a first lens group having positive power; a second lens group having negative power; a third lens group having positive power; a fourth lens group having positive power; a fifth lens group having negative power; and a sixth lens group having positive power. During zooming, a distance between two adjacent lens groups changes, the two adjacent lens groups being selected from among the first lens group, the second lens group, the third lens group, the fourth lens group, the fifth lens group, and the sixth lens group. The fourth lens group includes at least one positive lens that satisfies the following conditional formula (1). The following conditional formulae (2) and (3) are satisfied.

$$vdp \geq 65 \tag{1},$$

$$1.19 \leq f3/ft \leq 4.15 \tag{2, and}$$

$$0.51 \leq f4/ft \leq 1.50 \tag{3},$$

where
- vdp: an Abbe number of the at least one positive lens in the fourth lens group with respect to a d-line,
- ft: a focal length of an entire system at a telephoto end,
- f3: a focal length of the third lens group, and
- f4: a focal length of the fourth lens group.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is a diagram showing a configuration of a zoom lens according to a sixth embodiment.

DETAILED DESCRIPTION OF EMBODIMENTS

Figure 1:
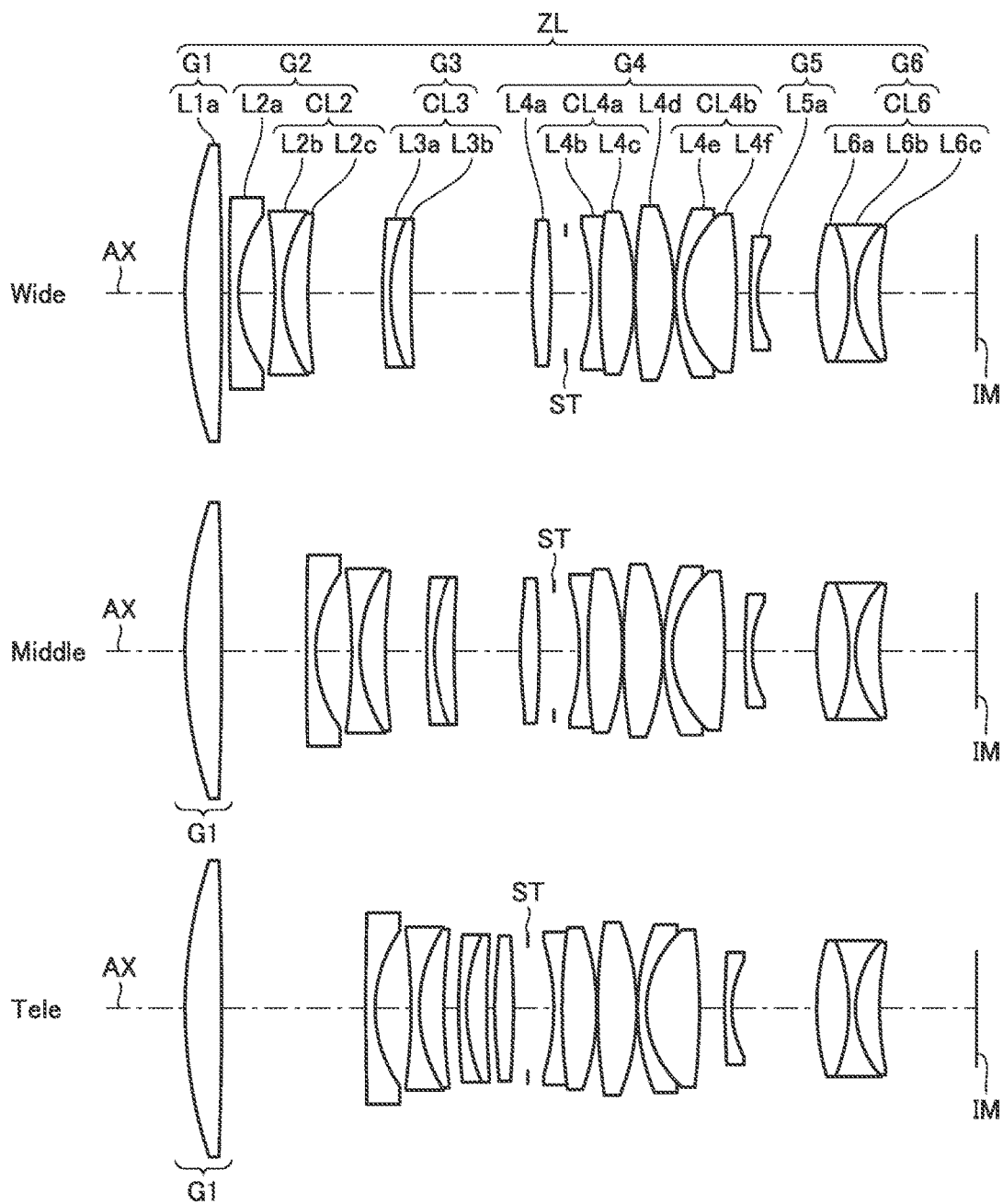
FIG. 1 is a diagram showing a configuration of a zoom lens according to a first embodiment.

Hereinafter, one or more embodiments of the present invention will be described with reference to the drawings. However, the scope of the invention is not limited to the disclosed embodiments.

The following describes one embodiment of the present disclosure with reference to the accompanying drawings. A zoom lens according to the embodiment includes, in order from the object side to the image surface side: a first lens group having positive power; a second lens group having negative power; a third lens group having positive power; a fourth lens group having positive power; a fifth lens group having negative power; and a sixth lens group having positive power. During zooming, a distance between two adjacent lens groups among the first to sixth lens groups changes. The fourth lens group includes at least one positive lens that satisfies the following conditional formula (1). The following conditional formulae (2) and (3) are satisfied.

$$vdp \geq 65 \tag{1},$$

$$1.19 \leq f3/ft \leq 4.15 \tag{2}, \text{ and}$$

$$0.51 \leq f4/ft \leq 1.50 \tag{3},$$

where
vdp: an Abbe number of the at least one positive lens in the fourth lens group with respect to a d-line,
ft: a focal length of an entire system at a telephoto end,
f3: a focal length of the third lens group, and
f4: a focal length of the fourth lens group.

In the case of a zoom lens having a telephoto range, it is important to correct the spherical aberration and the axial chromatic aberration during zooming. The above-mentioned zoom lens includes six lens groups that are arranged in terms of power in order of positive, negative, positive, positive, negative, and positive from the object side. Thus, as compared with a zoom lens including five lens groups, the above-mentioned zoom lens including six lens groups can achieve a smaller F-number and can also suppress aberration variations caused by zooming.

By the arrangement in which at least one positive lens satisfying the conditional formula (1) is placed in the fourth lens group, the axial chromatic aberration can be excellently corrected over the entire zooming area.

The conditional formula (2) is defined for appropriately setting the focal length of the third lens group so as to excellently correct the spherical aberration over the entire zooming area. When the value of f3/ft falls below the lower limit set in the conditional formula (2), the power of the third lens group becomes excessively high. Thus, when the third lens group moves during zooming, the spherical aberration significantly varies, which makes it difficult to excellently correct the spherical aberration over the entire zooming area. When the value of f3/ft exceeds the upper limit set in the conditional formula (2), the power of the third lens group becomes excessively low. This makes it difficult to correct the spherical aberration occurring when the second and fourth lens groups move during zooming.

The conditional formula (3) is defined for appropriately setting the focal length of the fourth lens group so as to excellently correct the axial chromatic aberration over the entire zooming area. When the value of f4/ft falls below the lower limit set in the conditional formula (3), the power of the fourth lens group becomes excessively high, and thus, the axial chromatic aberration significantly varies when the fourth lens group moves during zooming. This makes it difficult to excellently correct the axial chromatic aberration over the entire zooming area. When the value of f4/ft exceeds the upper limit set in the conditional formula (3), the power of the fourth lens group having the positive lens satisfying the conditional formula (1) becomes low. Thus, an attempt to achieve a prescribed zoom ratio causes an axial chromatic aberration in other lens groups, which makes it difficult to excellently correct the axial chromatic aberration over the entire zooming area.

In the present embodiment, it is preferable that vdp satisfies the following conditional formula (1a).

$$vdp \geq 70 \tag{1a}$$

As to the condition range defined by the conditional formula (1), the conditional formula (1a) defines a more preferable condition range. Thus, when the value of vdp satisfies the conditional formula (1a), the above-described effect can be further enhanced.

In the present embodiment, it is preferable that f3/ft satisfies the following conditional formula (2a).

$$1.5 \leq f3/ft \leq 3.5 \tag{2a}$$

As to the condition range defined by the conditional formula (2), the conditional formula (2a) defines a more preferable condition range. Thus, when the value of f3/ft satisfies the conditional formula (2a), the above-described effect can be further enhanced.

In the present embodiment, it is preferable that f4/ft satisfies the following conditional formula (3a).

$$0.54 \leq f4/ft \leq 1.10 \tag{3a}$$

As to the condition range defined by the conditional formula (3), the conditional formula (3a) defines a more preferable condition range. Thus, when the value of f4/ft satisfies the conditional formula (3a), the above-described effect can be further enhanced.

In the present embodiment, the second lens group preferably includes at least one cemented lens that satisfies the following conditional formula (4):

$$nd2p-nd2n \geq 0.1 \qquad (4)$$

where nd2p: a refractive index of the positive lens included in at least one cemented lens in the second lens group with respect to the d-line, and nd2n: a refractive index of the negative lens included in at least one cemented lens in the second lens group with respect to the d-line.

The conditional formula (4) defines a condition for correcting the comatic aberration at the wide angle end and the spherical aberration at the telephoto end by an arrangement in which at least one cemented lens having a large refractive index difference at the cemented surface is placed in the second lens group. When the value of (nd2p−nd2n) falls below the lower limit set in the conditional formula (4), the difference between nd2p and nd2n decreases, which may lead to insufficient correction of at least one of the comatic aberration at the wide angle end and the spherical aberration at the telephoto end.

In the present embodiment, it is preferable that the value of (nd2p−nd2n) satisfies the following conditional formula (4a).

$$nd2p-nd2n \geq 0.15 \qquad (4a)$$

The conditional formula (4a) defines a more preferable condition range as to the condition range defined by the conditional formula (4). Thus, when the value of (nd2p−nd2n) satisfies the conditional formula (4a), the above-described effect can be further more enhanced.

In the present embodiment, it is preferable that the following conditional formula (5) is satisfied.

$$0.1 \leq f4/f1 \leq 0.4 \qquad (5)$$

where f1: a focal length of the first lens group.

The conditional formula (5) is defined for appropriately setting the focal length of the fourth lens group and the focal length of the first lens group so as to downsize the entire imaging system and excellently correct aberrations. When the value of f4/f1 falls below the lower limit set in the conditional formula (5), the power of the first lens group with respect to the fourth lens group becomes excessively low, which makes it difficult to shorten the entire optical length, with the result that the entire imaging system is increased in size. When the value of f4/f1 exceeds the upper limit set in the conditional formula (5), the power of the first lens group with respect to the fourth lens group becomes excessively high, which makes it difficult to correct the spherical aberration and the axial chromatic aberration at the telephoto end.

In the present embodiment, it is preferable that f4/f1 satisfies the following conditional formula (5a).

$$0.15 \leq f4/f1 \leq 0.35 \qquad (5a)$$

As to the condition range defined by the conditional formula (5), the conditional formula (5a) defines a more preferable condition range. Thus, when the value of f4/f1 satisfies the conditional formula (5a), the above-described effect can be further enhanced.

In the present embodiment, it is preferable that the fifth lens group moves along the optical axis during focusing from a far-distance object to a near-distance object so as to satisfy the following conditional formula (6).

$$-3.5 \leq f5/f6 \leq -0.5 \qquad (6)$$

where f5: a focal length of the fifth lens group, and f6: a focal length of the sixth lens group.

The conditional formula (6) is defined for appropriately setting the ratio between the focal length of the fifth lens group and the focal length of the sixth lens group so as to suppress the aberration variation caused by focusing. The sixth lens group having positive power corrects the aberration caused by movement of the fifth lens group having negative power. When the value of f5/f6 falls below the lower limit set in the conditional formula (6), the power of the fifth lens group with respect to the power of the sixth lens group becomes excessively low. This leads to excessive correction of aberration by the sixth lens group for the variations such as field curvature occurring in the fifth lens group during focusing. When the value of f5/f6 exceeds the upper limit set in the conditional formula (6), the power of the fifth lens group with respect to the sixth lens group becomes excessively high. This may lead to insufficient correction of aberration by the sixth lens group for the variations such as field curvature occurring in the fifth lens group during focusing.

In the present embodiment, it is preferable that f5/f6 satisfies the following conditional formula (6a).

$$-1.2 \leq f5/f6 \leq -0.4 \qquad (6a)$$

As to the condition range defined by the conditional formula (6), the conditional formula (6a) defines a more preferable condition range. Thus, when the value of f5/f6 satisfies the conditional formula (6a), the above-described effect can be further enhanced.

In the present embodiment, it is preferable that the following conditional formula (7) is satisfied.

$$1.5 \leq f1/ft \leq 10 \qquad (7)$$

where f1: a focal length of the first lens group.

The conditional formula (7) is defined for appropriately setting the focal length of the first lens group so as to downsize the entire imaging system and excellently correct aberrations. When the value of f1/ft falls below the lower limit set in the conditional formula (7), the power of the first lens group becomes excessively high, which makes it difficult to correct the spherical aberration and the axial chromatic aberration at the telephoto end. When the value of f1/ft exceeds the upper limit set in the conditional formula (7), the power of the first lens group becomes excessively low, which makes it difficult to shorten the entire optical length, with the result that the entire imaging system is increased in size.

In the present embodiment, it is preferable that f1/ft satisfies the following conditional formula (7a).

$$1.7 \leq f1/ft \leq 5 \qquad (7a)$$

As to the condition range defined by the conditional formula (7), the conditional formula (7a) defines a more preferable condition range. Thus, when the value of f1/ft satisfies the conditional formula (7a), the above-described effect can be further enhanced.

In the present embodiment, it is preferable that the first lens group is formed of one positive lens.

In the first lens group of a zoom lens having a wide angle of view at the wide angle end (for example, the angle of view at the wide angle end exceeds 80°, the lens diameter tends to be significantly large. By the first lens group formed of one positive lens, the entire zoom lens can be reduced in weight.

<Specific Optical Configuration of Zoom Lens According to Embodiment>

FIGS. 1 to 6 each are a lens configuration diagram showing a configuration of a zoom lens ZL according to a corresponding one of the first to sixth embodiments. In each of FIGS. 1 to 6, "Wide" is a cross-sectional view of lenses at the wide angle end; "Middle" is a cross-sectional view of lenses in the middle focal length state, "Tele" is a cross-sectional view of lenses at the telephoto end, and "AX" shows an optical axis. "Wide", "Middle", and "Tele" each are a cross-sectional view of lenses seen when a focus is set on an object at infinity

First Embodiment

As shown in FIG. 1, a zoom lens ZL according to the first embodiment includes, in order from the object side to the image surface side: a first lens group G1 having positive power; a second lens group G2 having negative power; a third lens group G3 having positive power; a fourth lens group G4 having positive power; a fifth lens group G5 having negative power; and a sixth lens group G6 having positive power. During zooming, the distance between two adjacent lens groups among first to sixth lens groups G1 to G6 changes. For example, during zooming, sixth lens group G6 is fixed and first to fifth lens groups G1 to G5 move. During zooming, an aperture stop ST moves together with fourth lens group G4. During focusing from a far-distance object to a near-distance object, fifth lens group G5 is moved toward an image surface TM along an optical axis AX.

Each of first to sixth lens groups G1 to G6 in the first embodiment is configured as in the following order from the object side when each lens is viewed in a paraxial surface shape.

First lens group G1 is formed of a biconvex positive lens L1a.

Second lens group G2 is formed of a negative meniscus lens L2a having a convex surface facing the object side, a biconcave negative lens L2b, and a positive meniscus lens L2c having a convex surface facing the object side. Negative lens L2b and positive meniscus lens L2c are cemented to form a cemented lens CL2.

Third lens group G3 is formed of a negative meniscus lens L3a having a convex surface facing the object side and a positive meniscus lens L3b having a convex surface facing the object side. Negative meniscus lens L3a and positive meniscus lens L3b are cemented to form a cemented lens CL3.

Fourth lens group G4 is formed of a biconvex positive lens L4a, a biconcave negative lens L4b, a biconvex positive lens L4c, a biconvex positive lens L4d, a negative meniscus lens L4e having a convex surface facing the object side, and a biconvex positive lens L4f. Positive lens L4a is an aspheric single lens. Negative lens L4b and positive lens L4c are cemented to form a cemented lens CL4a. Negative meniscus lens L4e and positive lens L4f are cemented to form a cemented lens CL4b. An aperture stop ST is disposed between positive lens L4a and negative lens L4b.

Fifth lens group G5 is formed of a negative meniscus lens L5a having a convex surface facing the object side. Negative meniscus lens L5a is an aspheric single lens.

Sixth lens group G6 is formed of a biconvex positive lens L6a, a biconcave negative lens L6b, and a positive meniscus lens L6c having a convex surface facing the object side. Positive lens L6a, negative lens L6b, and positive meniscus lens L6c are cemented to form a cemented lens CL6.

Second Embodiment

Figure 2:
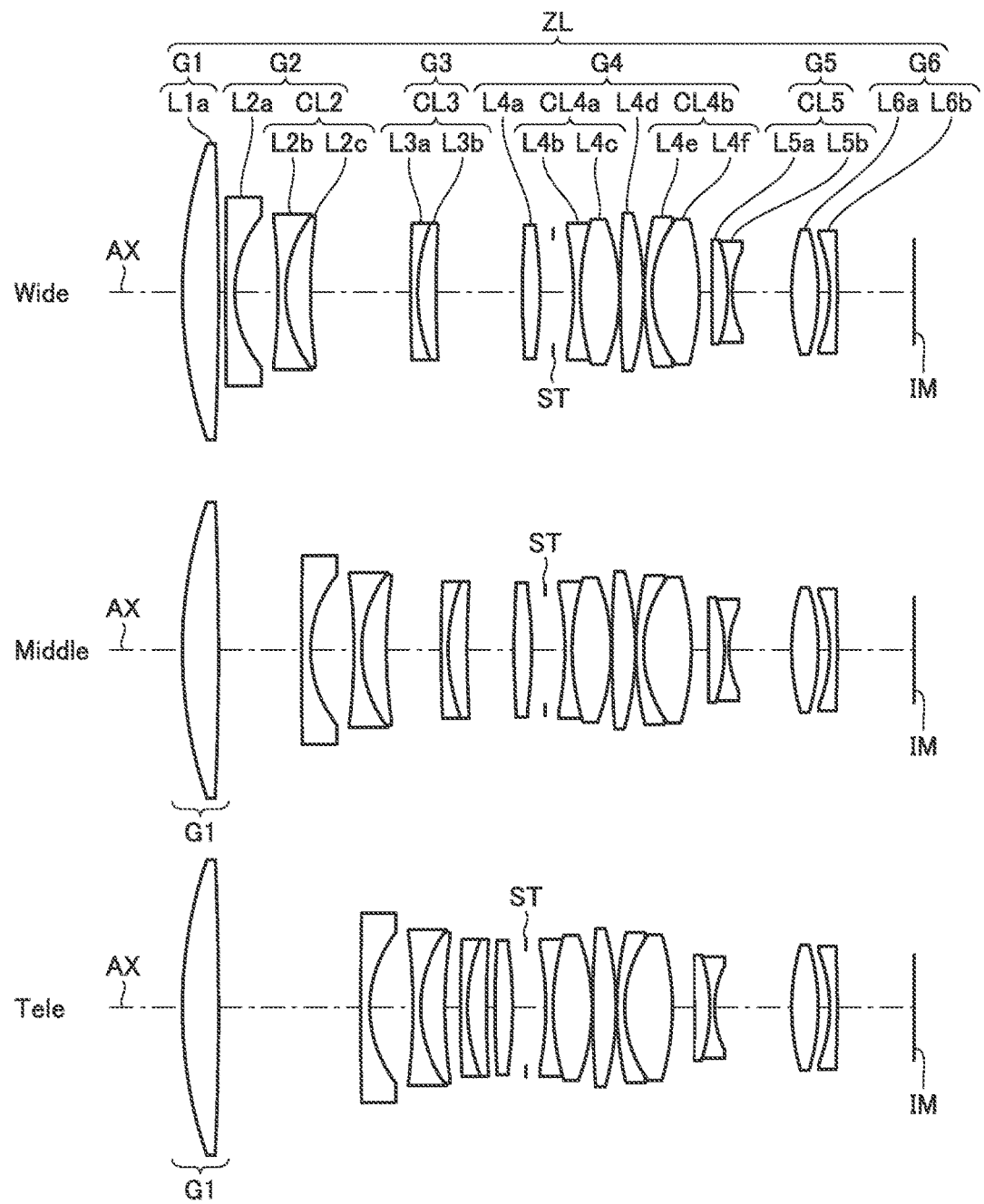
FIG. 2 is a diagram showing a configuration of a zoom lens according to a second embodiment.

As shown in FIG. 2, a zoom lens ZL according to the second embodiment includes, in order from the object side: a first lens group G1 having positive power; a second lens group G2 having negative power; a third lens group G3 having positive power; a fourth lens group G4 having positive power; a fifth lens group G5 having negative power; and a sixth lens group G6 having positive power. During zooming, the distance between two adjacent lens groups among first to sixth lens groups G1 to G6 changes. For example, during zooming, sixth lens group G6 is fixed and the first to fifth lens groups G1 to G5 move. During zooming, an aperture stop ST moves together with fourth lens group G4. During focusing from a far-distance object to a near-distance object, fifth lens group G5 is moved toward an image surface TM along an optical axis AX.

Each of first to sixth lens groups G1 to G6 in the second embodiment is configured as in the following order from the object side when each lens is viewed in a paraxial surface shape.

First lens group G1 is formed of a biconvex positive lens L1a.

Second lens group G2 is formed of a negative meniscus lens L2a having a convex surface facing the object side, a biconcave negative lens L2b, and a positive meniscus lens L2c having a convex surface facing the object side. Negative lens L2b and positive meniscus lens L2c are cemented to form a cemented lens CL2.

Third lens group G3 is formed of a negative meniscus lens L3a having a convex surface facing the object side and a positive meniscus lens L3b having a convex surface facing the object side. Negative meniscus lens L3a and positive meniscus lens L3b are cemented to form a cemented lens CL3.

Fourth lens group G4 is formed of a biconvex positive lens L4a, a biconcave negative lens L4b, a biconvex positive lens L4c, a biconvex positive lens L4d, a negative meniscus lens L4e having a convex surface facing the object side, and a biconvex positive lens L4f. Positive lens L4a is an aspheric single lens. Negative lens L4b and positive lens L4c are cemented to form a cemented lens CL4a. Negative meniscus lens L4e and positive lens L4f are cemented to form a cemented lens CL4b. An aperture stop ST is disposed between positive lens L4a and negative lens L4b.

Fifth lens group G5 is formed of a positive meniscus lens L5a having a convex surface facing image surface IM and a biconcave negative lens L5b. Positive meniscus lens L5a and negative lens L5b are cemented to form a cemented lens CL5.

Sixth lens group G6 is formed of a biconvex positive lens L6a and a negative meniscus lens L6b having a convex surface facing image surface IM. Negative meniscus lens L6b is an aspheric single lens.

Third Embodiment

Figure 3:
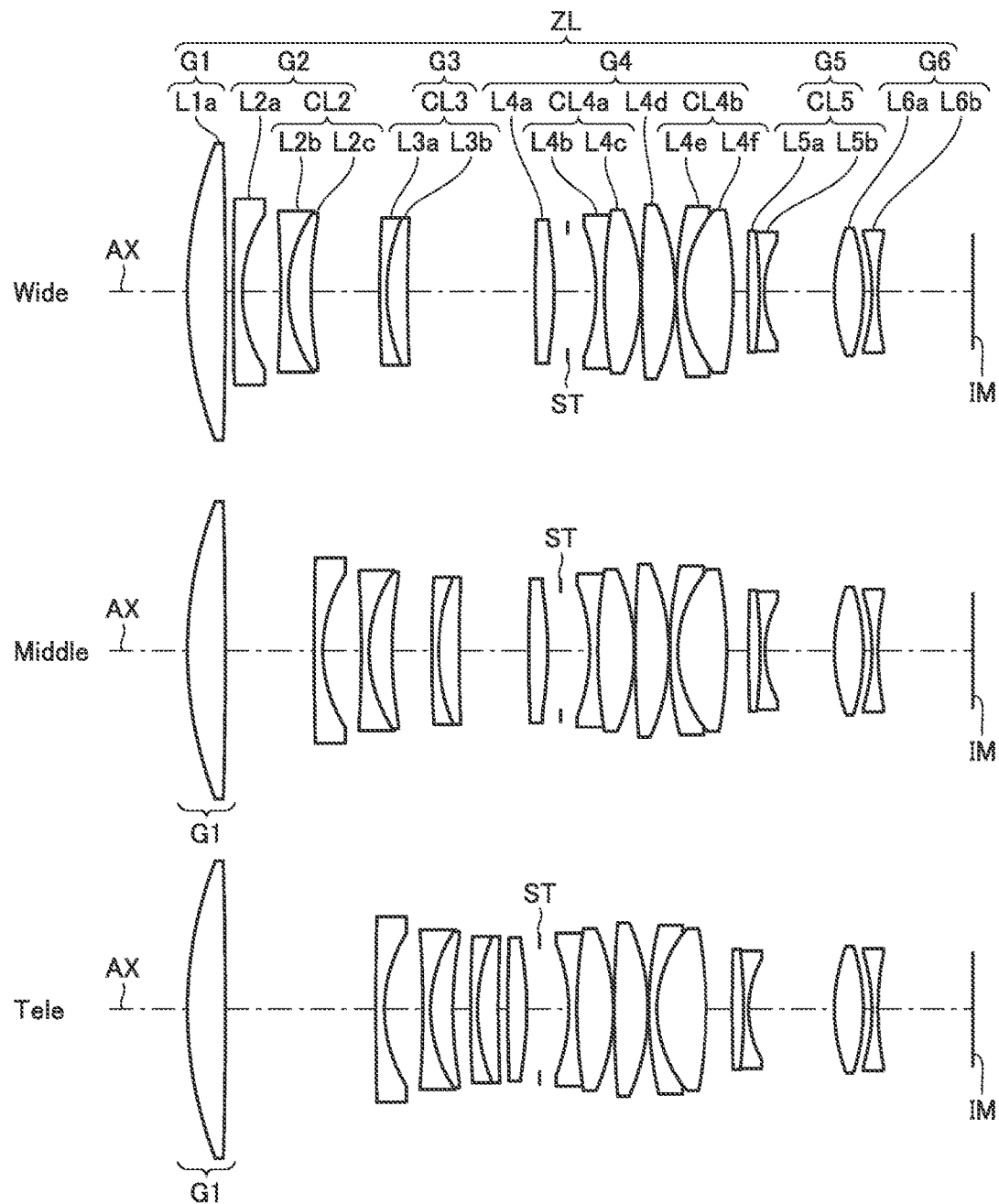
FIG. 3 is a diagram showing a configuration of a zoom lens according to a third embodiment.

As shown in FIG. 3, a zoom lens ZL according to the third embodiment includes, in order from the object side: a first lens group G1 having positive power; a second lens group G2 having negative power; a third lens group G3 having positive power; a fourth lens group G4 having positive power; a fifth lens group G5 having negative power; and a sixth lens group G6 having positive power. During zooming, the distance between two adjacent lens groups among first to sixth lens groups G1 to G6 changes. For example, during zooming, sixth lens group G6 is fixed, and first to fifth lens groups G1 to G5 move. During zooming, an aperture stop ST moves together with fourth lens group G4. During focusing from a far-distance object to a near-distance object, fifth lens group G5 is moved toward an image surface IM along an optical axis AX.

Each of first to sixth lens groups G1 to G6 in the third embodiment is configured as in the following order from the object side when each lens is viewed in a paraxial surface shape.

First lens group G1 is formed of a biconvex positive lens L1a.

Second lens group G2 is formed of a negative meniscus lens L2a having a convex surface facing the object side, a biconcave negative lens L2b, and a positive meniscus lens L2c having a convex surface facing the object side. Negative lens L2b and positive meniscus lens L2c are cemented to form a cemented lens CL2.

Third lens group G3 is formed of a negative meniscus lens L3a having a convex surface facing the object side and a positive meniscus lens L3b having a convex surface facing the object side. Negative meniscus lens L3a and positive meniscus lens L3b are cemented to form a cemented lens CL3.

Fourth lens group G4 is formed of a biconvex positive lens L4a, a biconcave negative lens L4b, a biconvex positive lens L4c, a biconvex positive lens L4d, a negative meniscus lens L4e having a convex surface facing the object side, and a biconvex positive lens L4f. Positive lens L4a is an aspheric single lens. Negative lens L4b and positive lens L4c are cemented to form a cemented lens CL4a. Negative meniscus lens L4e and positive lens L4f are cemented to form a cemented lens CL4b. An aperture stop ST is disposed between positive lens L4a and negative lens L4b.

Fifth lens group G5 is formed of a biconvex positive lens L5a and a biconcave negative lens L5b. Positive lens L5a and negative lens L5b are cemented to form a cemented lens CL5.

Sixth lens group G6 is formed of a biconvex positive lens L6a and a biconcave negative lens L6b.

Fourth Embodiment

Figure 4:
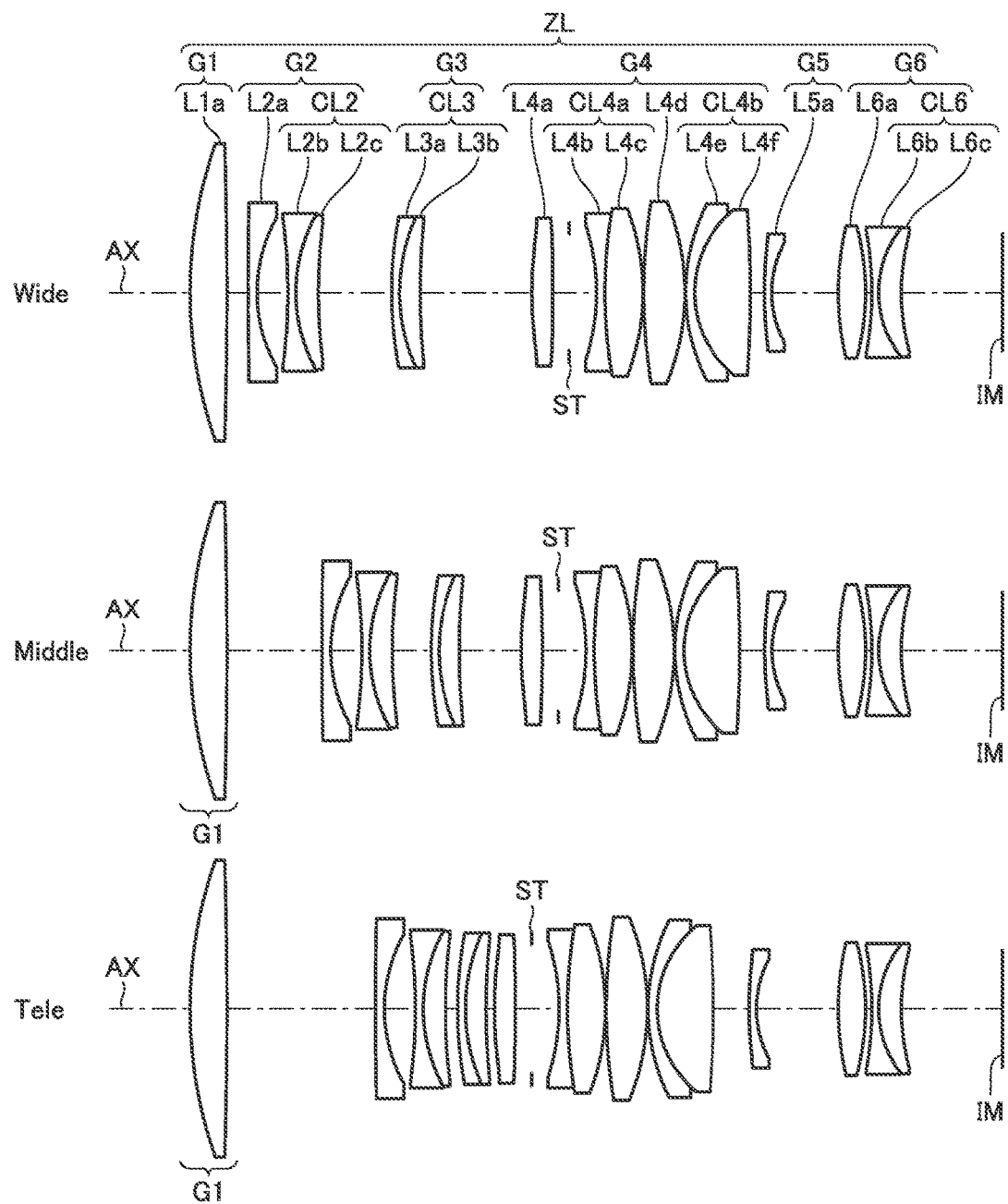
FIG. 4 is a diagram showing a configuration of a zoom lens according to a fourth embodiment.

As shown in FIG. 4, a zoom lens ZL according to the fourth embodiment includes, in order from the object side: a first lens group G1 having positive power; a second lens group G2 having negative power; a third lens group G3 having positive power; a fourth lens group G4 having positive power; a fifth lens group G5 having negative power; and a sixth lens group G6 having positive power. During zooming, the distance between two adjacent lens groups among first to sixth lens groups G1 to G6 changes. For example, during zooming, sixth lens group G6 is fixed, and first to fifth lens groups G1 to G5 move. During zooming, an aperture stop ST moves together with fourth lens group G4. During focusing from a far-distance object to a near-distance object, fifth lens group G5 is moved toward an image surface IM along an optical axis AX.

Each of first to sixth lens groups G1 to G6 in the fourth embodiment is configured as in the following order from the object side when each lens is viewed in a paraxial surface shape.

First lens group G1 is formed of a biconvex positive lens L1a.

Second lens group G2 is formed of a negative meniscus lens L2a having a convex surface facing the object side, a biconcave negative lens L2b, and a positive meniscus lens L2c having a convex surface facing the object side. Negative lens L2b and positive meniscus lens L2c are cemented to form a cemented lens CL2.

Third lens group G3 is formed of a negative meniscus lens L3a having a convex surface facing the object side and a positive meniscus lens L3b having a convex surface facing the object side. Negative meniscus lens L3a and positive meniscus lens L3b are cemented to form a cemented lens CL3.

Fourth lens group G4 is formed of a biconvex positive lens L4a, a biconcave negative lens L4b, a biconvex positive lens L4c, a biconvex positive lens L4d, a negative meniscus lens L4e having a convex surface facing the object side, and a biconvex positive lens L4f. Positive lens L4a is an aspheric single lens. Negative lens L4b and positive lens L4c are cemented to form a cemented lens CL4a. Negative meniscus lens L4e and positive lens L4f are cemented to form a cemented lens CL4b. An aperture stop ST is disposed between positive lens L4a and negative lens L4b.

Fifth lens group G5 is formed of a negative meniscus lens L5a having a convex surface facing the object side. Negative meniscus lens L5a is an aspheric single lens.

Sixth lens group G6 is formed of a biconvex positive lens L6a, a biconcave negative lens L6b, and a positive meniscus lens L6c having a convex surface facing the object side. Negative lens L6b and positive meniscus lens L6c are cemented to form a cemented lens CL6.

Fifth Embodiment

Figure 5:
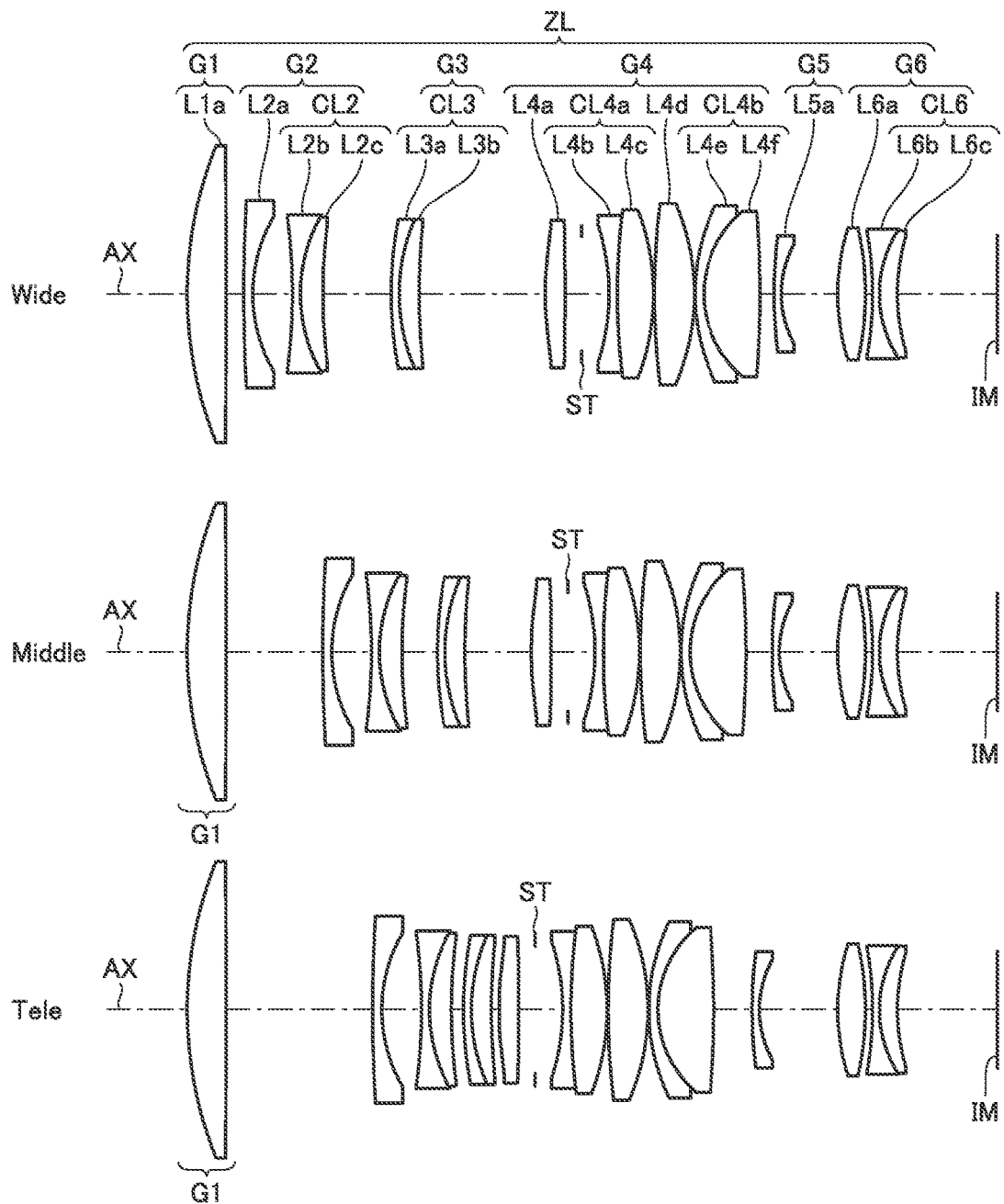
FIG. 5 is a diagram showing a configuration of a zoom lens according to a fifth embodiment.
Figure 7A:
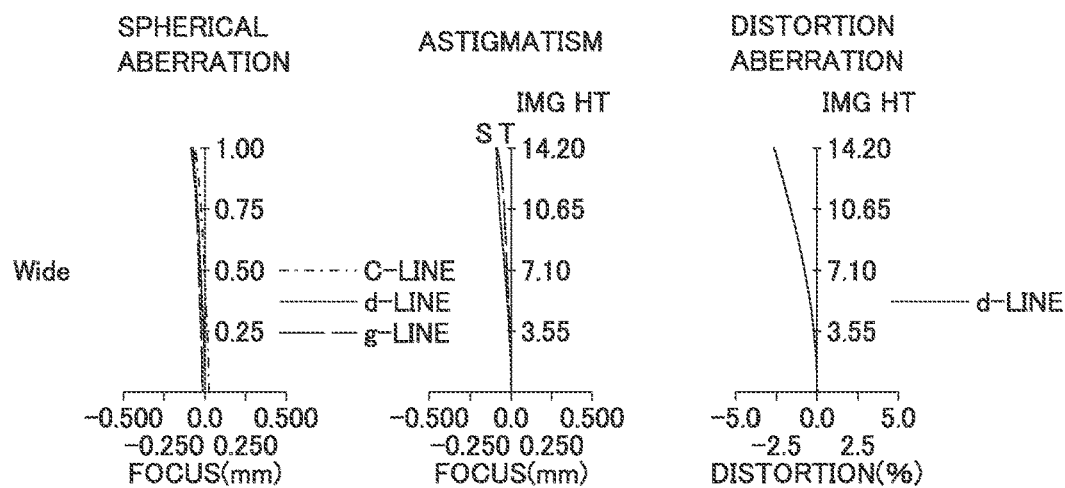
FIG. 7A is a longitudinal aberration diagram at a wide angle end in Example 1 and shows aberrations (a spherical aberration, an astigmatism, and a distortion aberration) at the wide angle end.
Figure 7B:
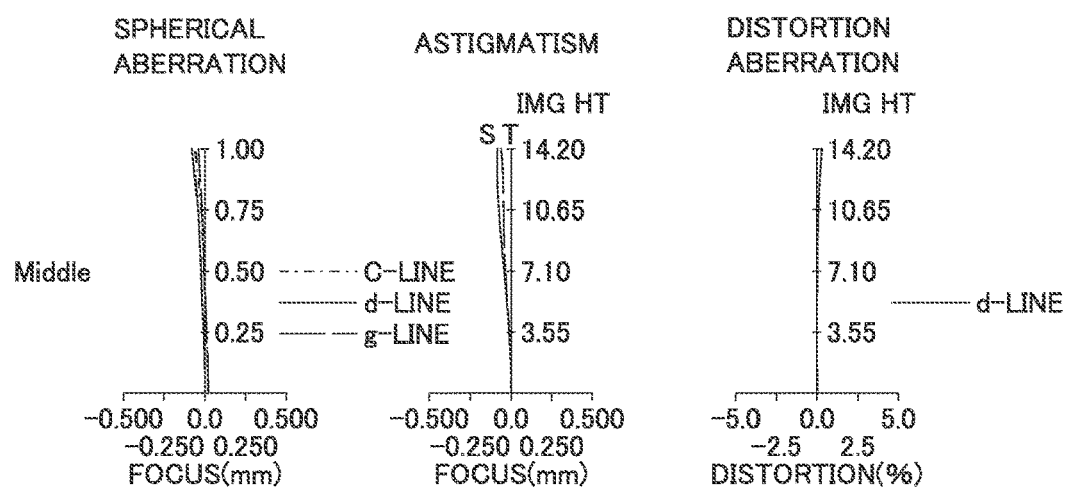
FIG. 7B is a longitudinal aberration diagram in a middle focal length state in Example 1 and shows aberrations (a spherical aberration, an astigmatism, and a distortion aberration) in the middle focal length state.
Figure 7C:
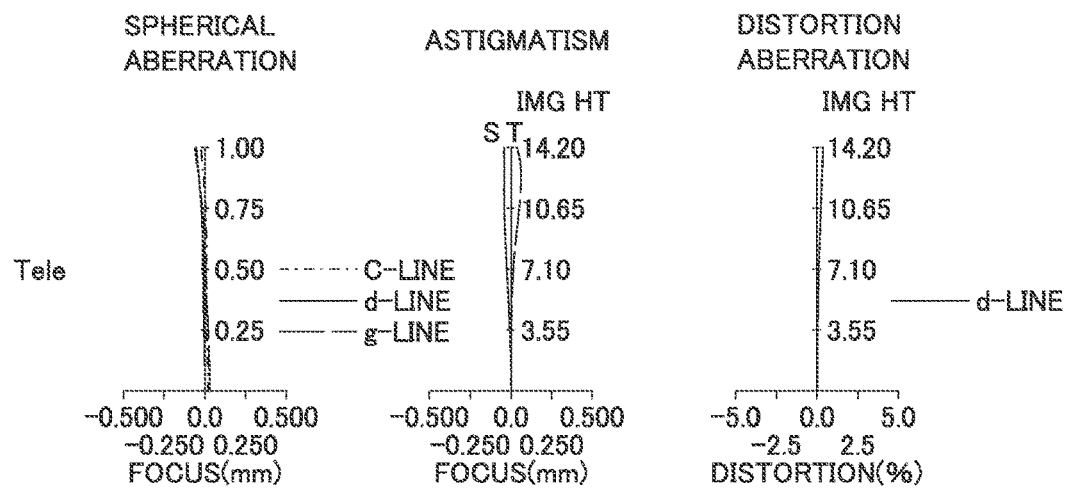
FIG. 7C is a longitudinal aberration diagram at a telephoto end in Example 1 and shows aberrations (a spherical aberration, an astigmatism, and a distortion aberration) at the telephoto end.
Figure 8A:
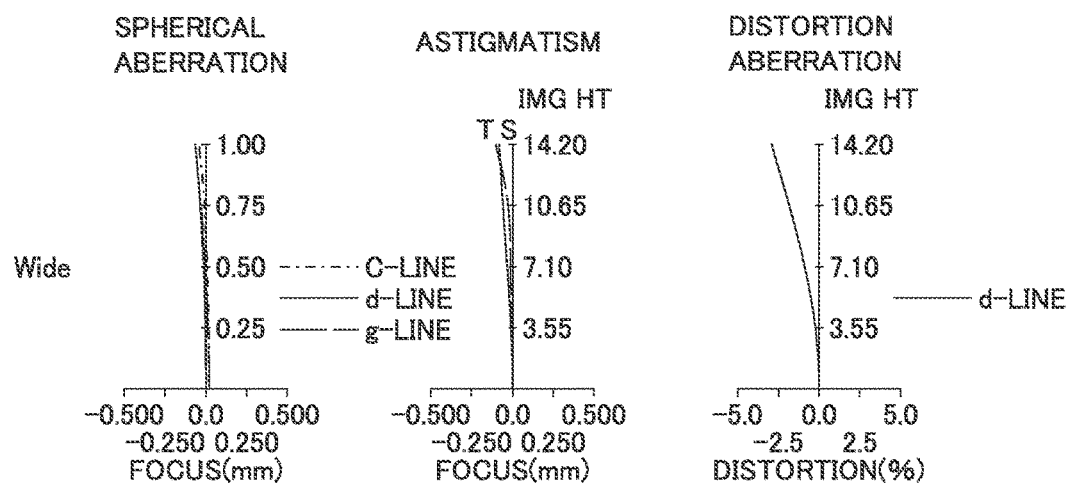
FIG. 8A is a longitudinal aberration diagram at a wide angle end in Example 2 and shows aberrations (a spherical aberration, an astigmatism, and a distortion aberration) at the wide angle end.
Figure 8B:
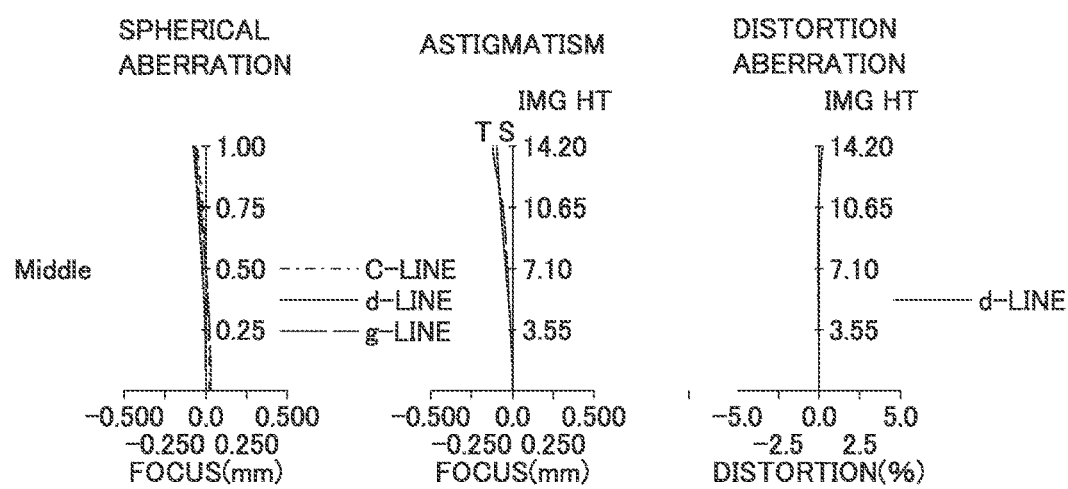
FIG. 8B is a longitudinal aberration diagram in a middle focal length state in Example 2 and shows aberrations (a spherical aberration, an astigmatism, and a distortion aberration) in the middle focal length state.
Figure 8C:
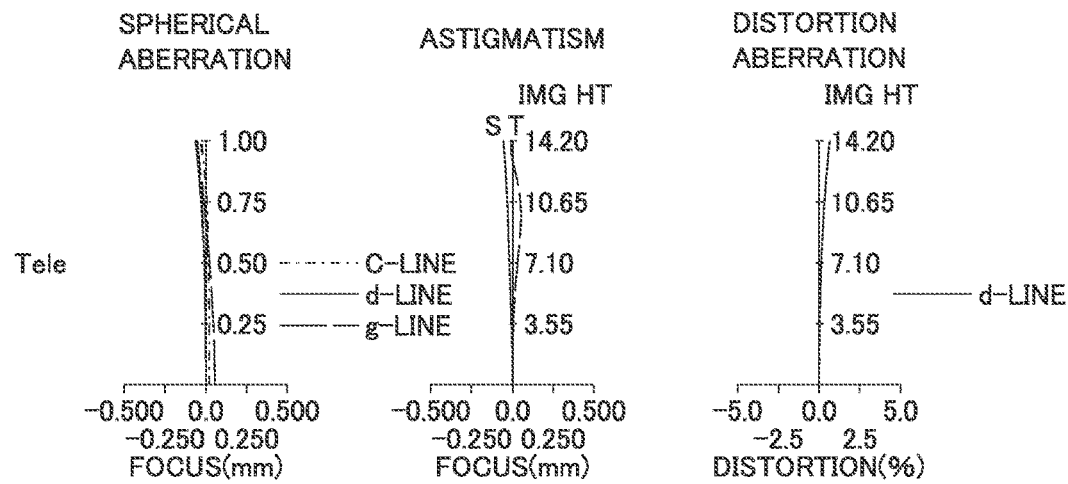
FIG. 8C is a longitudinal aberration diagram at a telephoto end in Example 2 and shows aberrations (a spherical aberration, an astigmatism, and a distortion aberration) at the telephoto end.
Figure 9A:
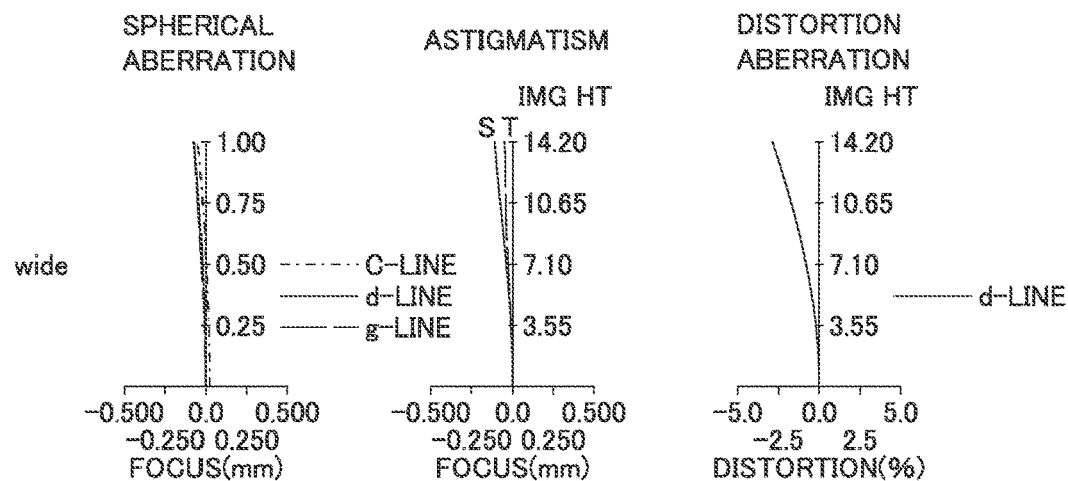
FIG. 9A is a longitudinal aberration diagram at a wide angle end in Example 3 and shows aberrations (a spherical aberration, an astigmatism, and a distortion aberration) at the wide angle end.
Figure 9B:
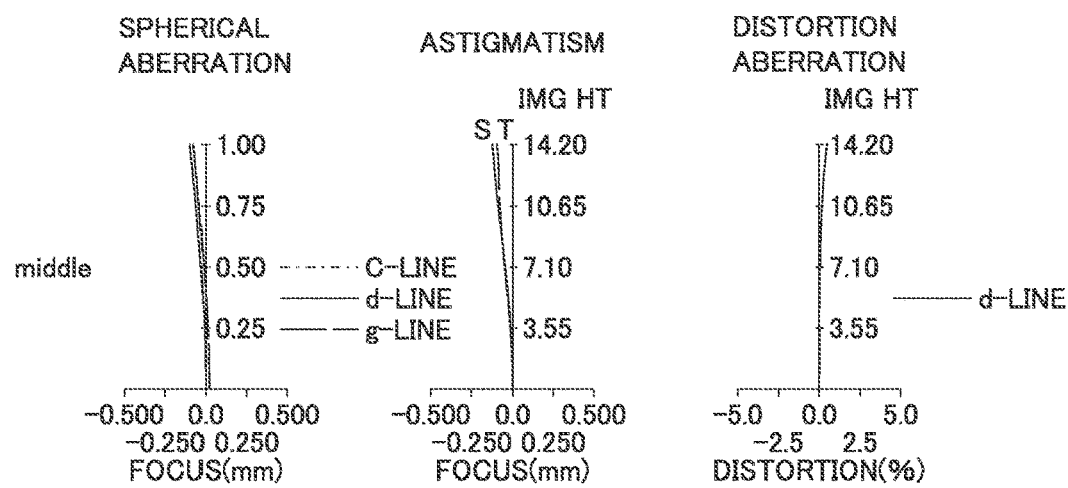
FIG. 9B is a longitudinal aberration diagram in a middle focal length state in Example 3 and shows aberrations (a spherical aberration, an astigmatism, and a distortion aberration) in the middle focal length state.
Figure 9C:
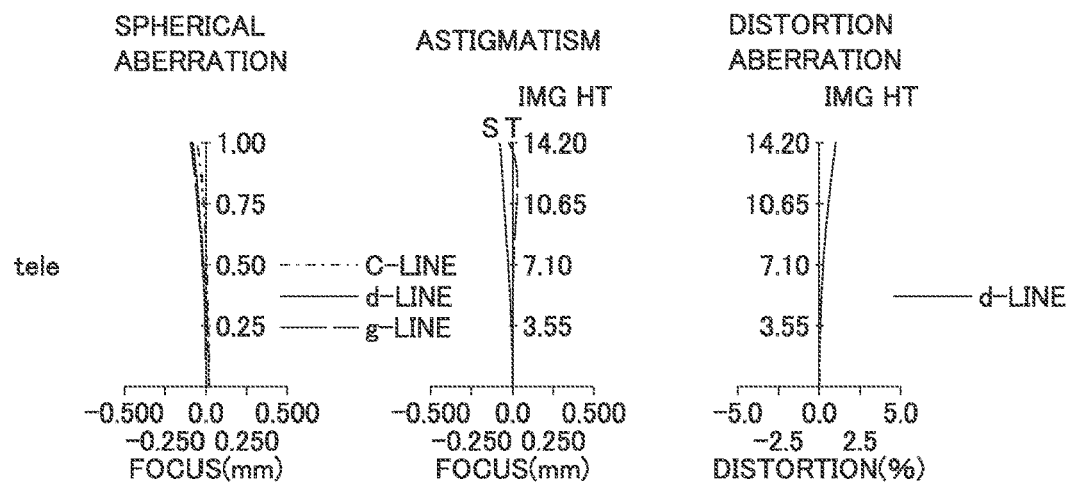
FIG. 9C is a longitudinal aberration diagram at a telephoto end in Example 3 and shows aberrations (a spherical aberration, an astigmatism, and a distortion aberration) at the telephoto end.
Figure 10A:
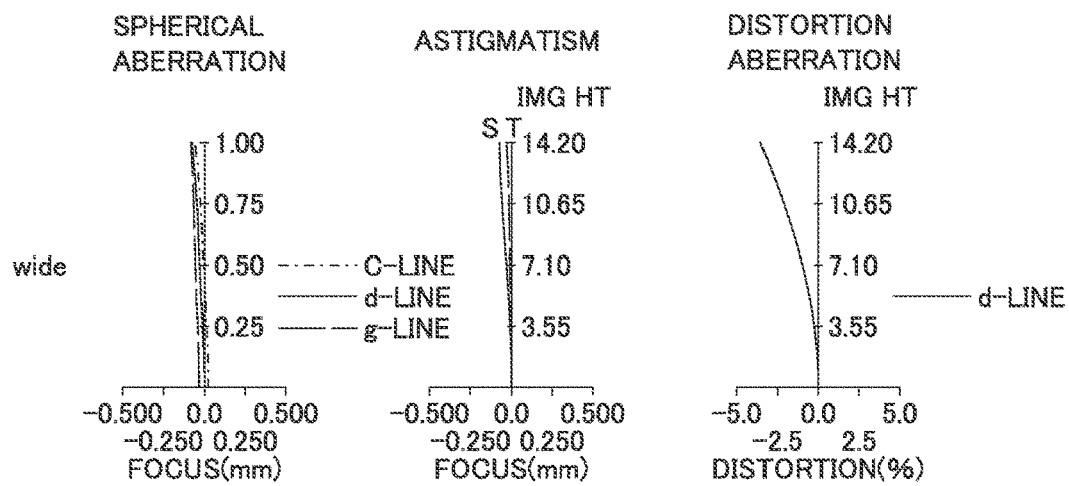
FIG. 10A is a longitudinal aberration diagram at a wide angle end in Example 4 and shows aberrations (a spherical aberration, an astigmatism, and a distortion aberration) at the wide angle end.
Figure 10B:
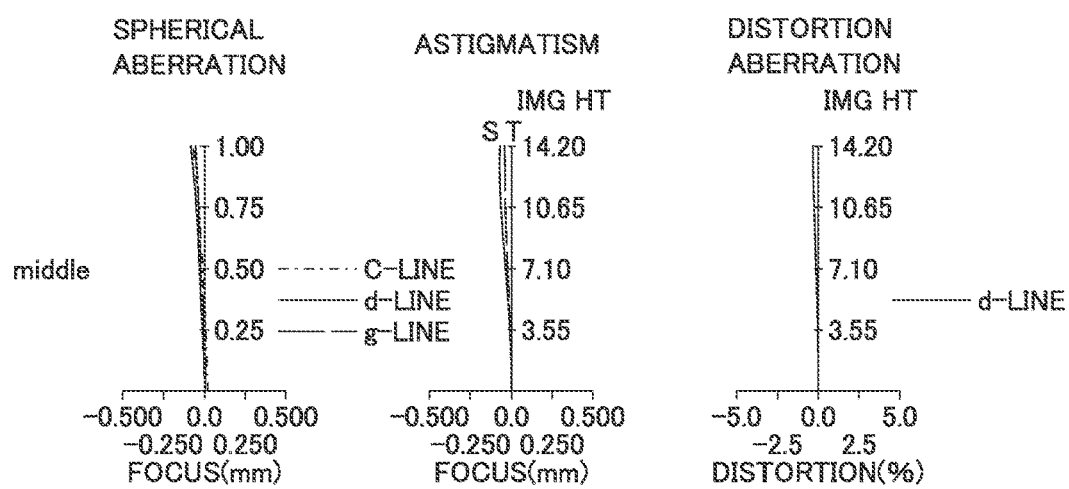
FIG. 10B is a longitudinal aberration diagram in a middle focal length state in Example 4 and shows aberrations (a spherical aberration, an astigmatism, and a distortion aberration) in the middle focal length state.
Figure 10C:
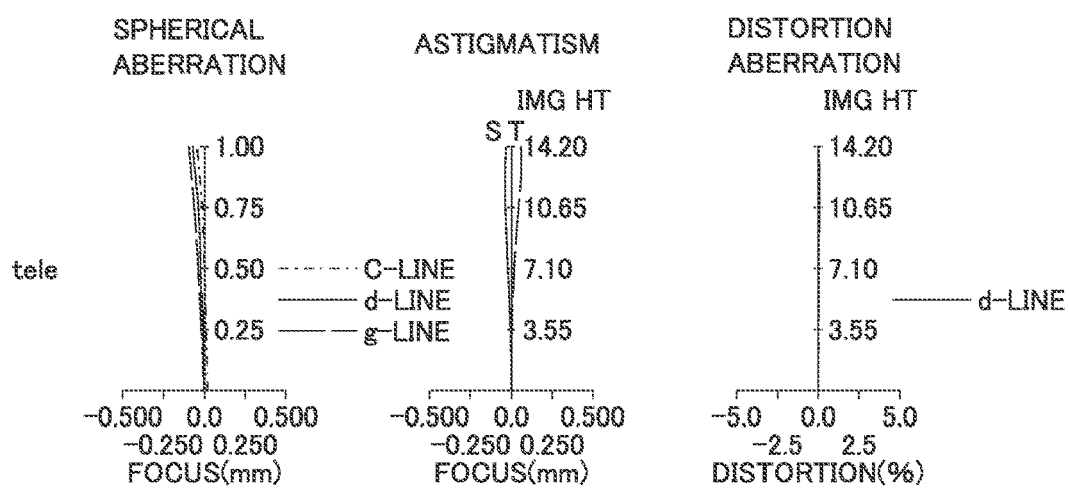
FIG. 10C is a longitudinal aberration diagram at a telephoto end in Example 4 and shows aberrations (a spherical aberration, an astigmatism, and a distortion aberration) at the telephoto end.
Figure 11A:
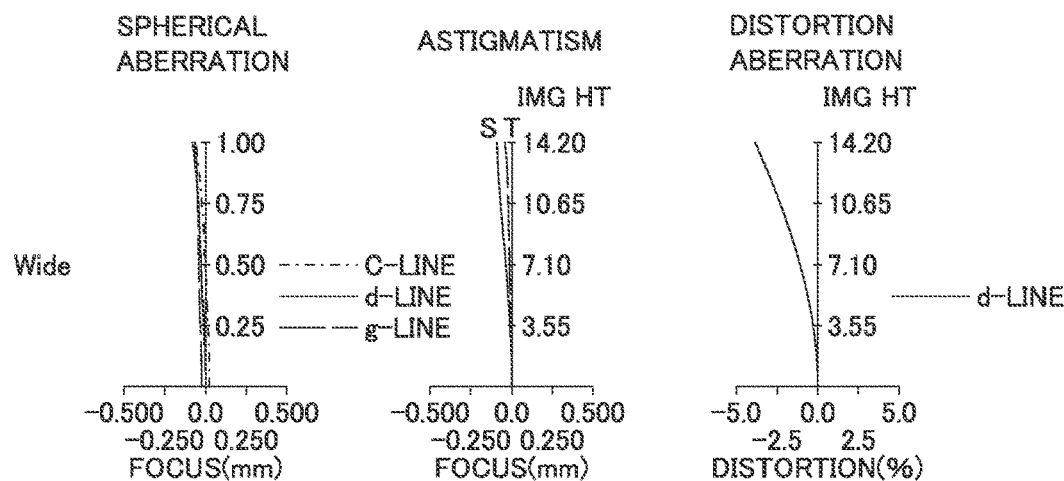
FIG. 11A is a longitudinal aberration diagram at a wide angle end in Example 5 and shows aberrations (a spherical aberration, an astigmatism, and a distortion aberration) at the wide angle end.
Figure 11B:
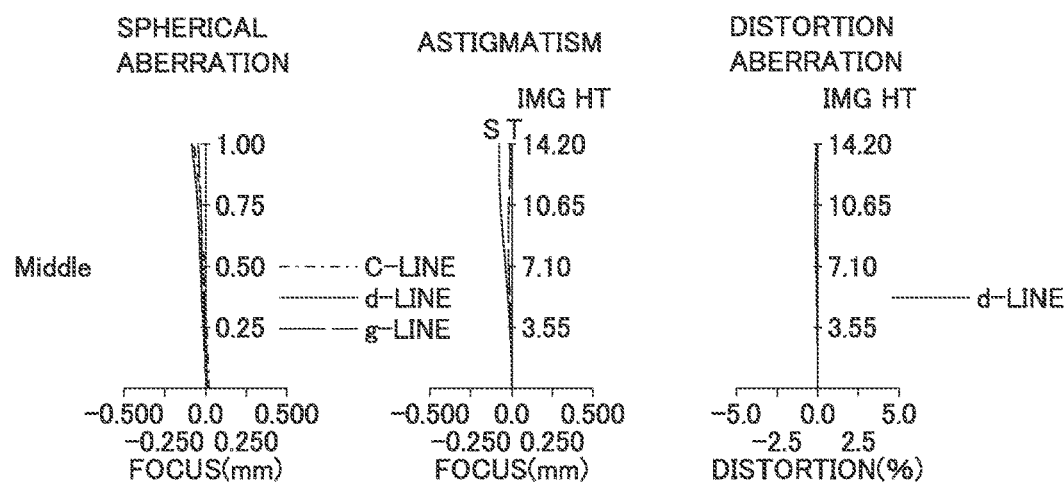
FIG. 11B is a longitudinal aberration diagram in a middle focal length state in Example 5 and shows aberrations (a spherical aberration, an astigmatism, and a distortion aberration) in the middle focal length state.
Figure 11C:
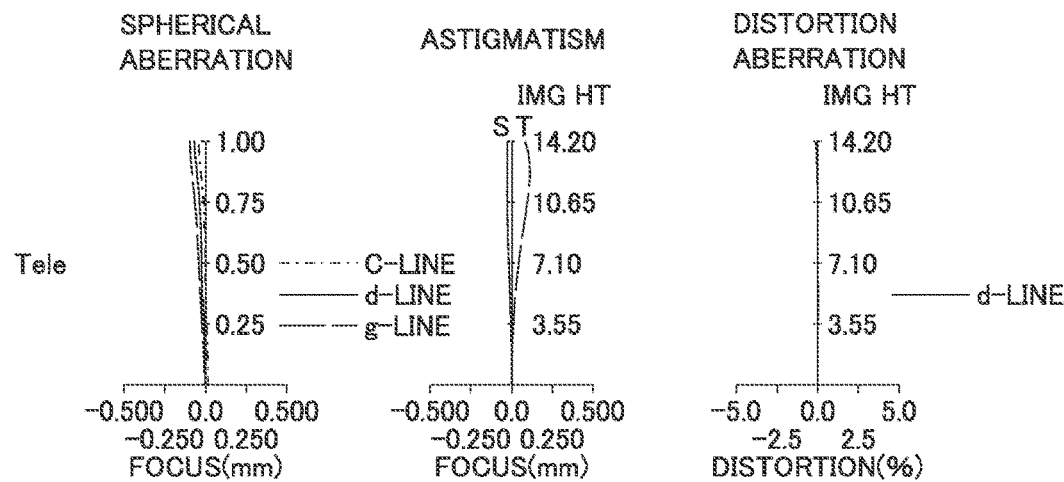
FIG. 11C is a longitudinal aberration diagram at a telephoto end in Example 5 and shows aberrations (a spherical aberration, an astigmatism, and a distortion aberration) at the telephoto end.
Figure 12A:
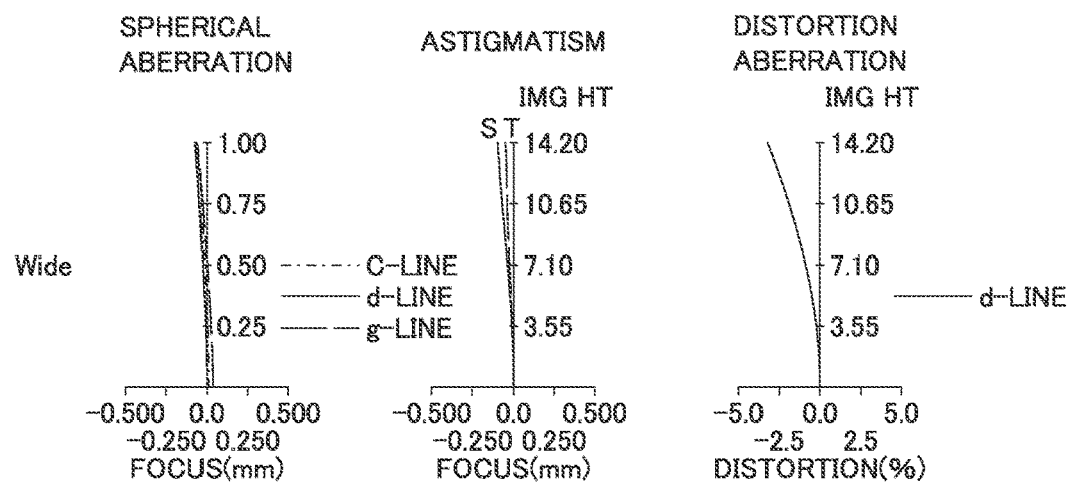
FIG. 12A is a longitudinal aberration diagram at a wide angle end in Example 6 and shows aberrations (a spherical aberration, an astigmatism, and a distortion aberration) at the wide angle end.
Figure 12B:
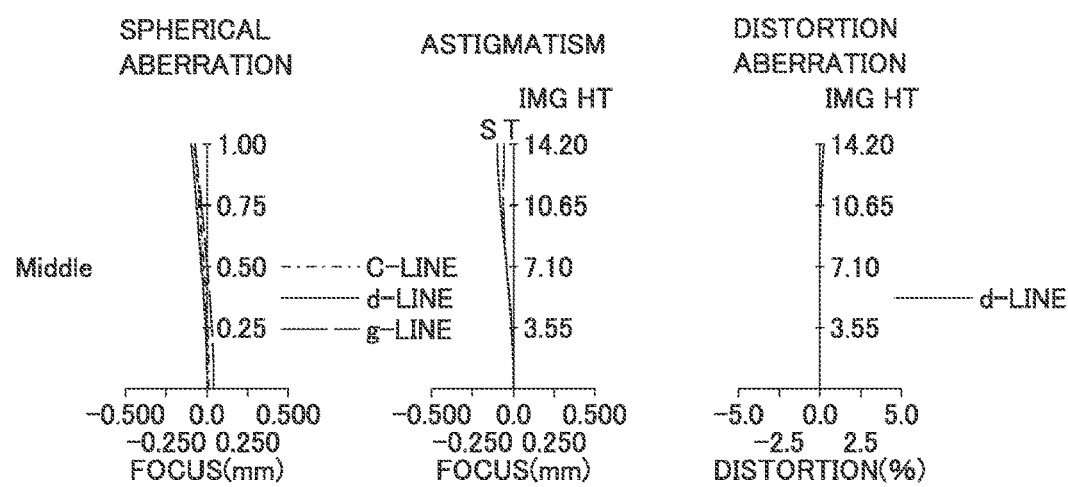
FIG. 12B is a longitudinal aberration diagram in a middle focal length state in Example 6 and shows aberrations (a spherical aberration, an astigmatism, and a distortion aberration) in the middle focal length state.
Figure 12C:
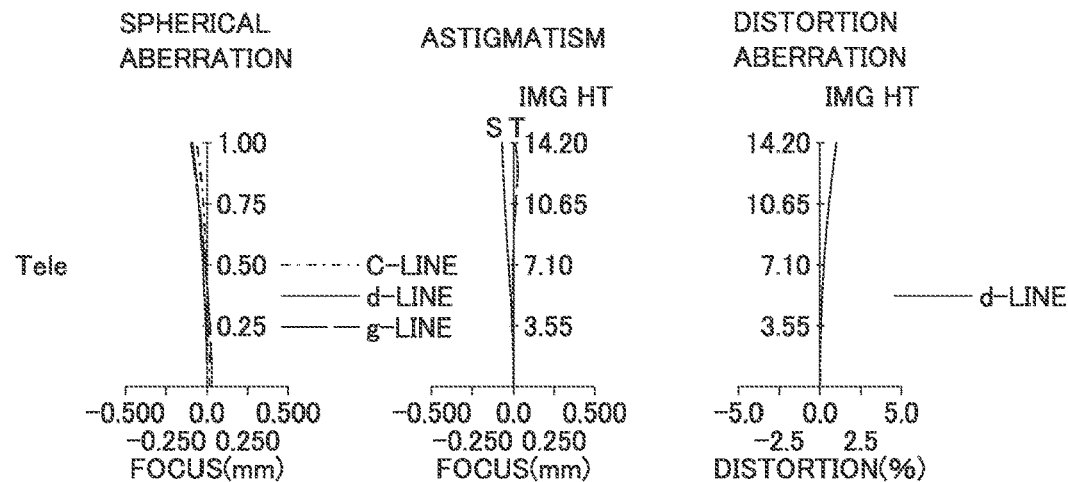
FIG. 12C is a longitudinal aberration diagram at a telephoto end in Example 6 and shows aberrations (a spherical aberration, an astigmatism, and a distortion aberration) at the telephoto end.

As shown in FIG. 5, a zoom lens ZL according to the fifth embodiment includes, in order from the object side: a first lens group G1 having positive power; a second lens group G2 having negative power; a third lens group G3 having positive power; a fourth lens group G4 having positive power; a fifth lens group G5 having negative power; and a sixth lens group G6 having positive power. During zooming, the distance between two adjacent lens groups among first to sixth lens groups G1 to G6 changes. For example, during zooming, sixth lens group G6 is fixed, and first to fifth lens groups G1 to G5 move. During zooming, an aperture stop ST moves together with fourth lens group G4. During focusing from a far-distance object to a near-distance object, fifth lens group G5 is moved toward an image surface IM along an optical axis AX.

Each of first to sixth lens groups G1 to G6 in the fifth embodiment is configured as in the following order from the object side when each lens is viewed in a paraxial surface shape.

First lens group G1 is formed of a biconvex positive lens L1a.

Second lens group G2 is formed of a negative meniscus lens L2a having a convex surface facing the object side, a biconcave negative lens L2b, and a positive meniscus lens L2c having a convex surface facing the object side. Negative lens L2b and positive meniscus lens L2c are cemented to form a cemented lens CL2.

Third lens group G3 is formed of a negative meniscus lens L3a having a convex surface facing the object side and a positive meniscus lens L3b having a convex surface facing the object side. Negative meniscus lens L3a and positive meniscus lens L3b are cemented to form a cemented lens CL3.

Fourth lens group G4 is formed of a biconvex positive lens L4a, a biconcave negative lens L4b, a biconvex positive lens L4c, a biconvex positive lens L4d, a negative meniscus lens L4e having a convex surface facing the object side, and a biconvex positive lens L4f. Positive lens L4a is an aspheric single lens. Negative lens L4b and positive lens L4c are cemented to form a cemented lens CL4a. Negative meniscus lens L4e and positive lens L4f are cemented to form a cemented lens CL4b. An aperture stop ST is disposed between positive lens L4a and negative lens L4b.

Fifth lens group G5 is formed of a negative meniscus lens L5a having a convex surface facing the object side. Negative meniscus lens L5a is an aspheric single lens.

Sixth lens group G6 is formed of a biconvex positive lens L6a, a biconcave negative lens L6b, and a positive meniscus lens L6c having a convex surface facing the object side. Negative lens L6b and positive meniscus lens L6c are cemented to form a cemented lens CL6.

Sixth Embodiment

As shown in FIG. 6, a zoom lens ZL according to the sixth embodiment includes, in order from the object side: a first lens group G1 having positive power; a second lens group G2 having negative power; a third lens group G3 having positive power; a fourth lens group G4 having positive power; a fifth lens group G5 having negative power; and a sixth lens group G6 having positive power. During zooming, the distance between two adjacent lens groups among first to sixth lens groups G1 to G6 changes. For example, during zooming, sixth lens group G6 is fixed, and the first to fifth lens groups G1 to G5 move. During zooming, an aperture stop ST moves together with fourth lens group G4. During focusing from a far-distance object to a near-distance object, fifth lens group G5 is moved toward an image surface TM along an optical axis AX.

Each of first to sixth lens groups G1 to G6 in the sixth embodiment is configured as in the following order from the object side when each lens is viewed in a paraxial surface shape.

First lens group G1 is formed of a biconvex positive lens L1a.

Second lens group G2 is formed of a negative meniscus lens L2a having a convex surface facing the object side, a biconcave negative lens L2b, and a positive meniscus lens L2c having a convex surface facing the object side. Negative lens L2b and positive meniscus lens L2c are cemented to form a cemented lens CL2.

Third lens group G3 is formed of a negative meniscus lens L3a having a convex surface facing the object side and a biconvex positive lens L3b. Negative meniscus lens L3a and positive lens L3b are cemented to form a cemented lens CL3.

Fourth lens group G4 is formed of a biconvex positive lens L4a, a biconcave negative lens L4b, a biconvex positive lens L4c, a biconvex positive lens L4d, a negative meniscus lens L4e having a convex surface facing the object side, and a biconvex positive lens L4f. Positive lens L4a is an aspheric single lens. Negative lens L4b and positive lens L4c are cemented to form a cemented lens CL4a. Negative meniscus lens L4e and positive lens L4f are cemented to form a cemented lens CL4b. An aperture stop ST is disposed between positive lens L4a and negative lens L4b.

Fifth lens group G5 is formed of a biconvex positive lens L5a and a biconcave negative lens L5b. Positive lens L5a and negative lens L5b are cemented to form a cemented lens CL5.

Sixth lens group G6 is formed of a biconvex positive lens L6a and a biconcave negative lens L6b.

EXAMPLES

The following more specifically describes the configuration and the like of the zoom lens according to each of the embodiments with reference to construction data and the like in each of Examples. Examples 1 to 6 described below are numerical examples corresponding to respective ones of the above-mentioned first to sixth embodiments. The lens configuration diagrams in the first to sixth embodiments (FIGS. 1 to 6) show the optical configurations (lens arrangements, lens shapes, and the like) in respective Examples 1 to 6.

The construction data in each of Examples show surface data in order, from the left column, of a surface number (object: an object surface, stop: aperture stop ST, image: image surface IM), a radius of curvature r (mm), an on-axis surface interval d (mm), a refractive index nd with respect to a d-line (a wavelength of 587.56 nm), and an Abbe number vd with respect to the d-line. The surface having a surface number "i" marked with a symbol "*" is an aspheric surface, and its surface shape is defined by the following formula (AS) employing local orthogonal coordinate systems (x, y, z) having a plane vertex as an origin point. As aspherical surface data, aspherical coefficients and the like are listed. Further, in the aspherical surface data in each of Examples, any coefficient of the term with no notation is 0, and all the data is defined as e−n=x $10^{-n}$.

$$z=(c\bullet h^2)/[1+\sqrt{\{1-(1+K)\bullet c^2\bullet h^2\}}]+\Sigma(Aj\bullet hj) \quad (AS)$$

where h: a height ($h^2=x^2+y^2$) in a direction perpendicular to a z axis (optical axis AX), z: a sag amount in the direction of optical axis AX (with reference to a plane vertex) at the position of height h, c: a curvature at the plane vertex (a reciprocal of radius of curvature r), K: a conical constant, and Aj: a j-th order aspheric coefficient.

Various types of data include: a zoom ratio; and, in each of the focal length states at a wide angle end (Wide), a middle focal length state (Middle) and a telephoto end (Tele), a focal length (F1, mm) of the entire system, F-number (Fno.), a half angle of view (ω, °), an image height (y'max, mm), a total lens length (TL, mm), a back focus (BF, mm), and a variable on-axis surface interval (variable: di (i: surface number), mm). Further, the focal length (mm) of each lens group is shown as lens group data. Note that back focus BF is represented by the distance from the last lens surface to the paraxial image surface in terms of an air conversion length. Total lens length TL is obtained by adding back focus BF to the distance from the foremost lens surface to the last lens surface.

In the spherical aberration diagram shown in FIGS. 7A to 12C, an amount of spherical aberration with respect to the d-line (a wavelength of 587.56 nm) (indicated by a solid line), an amount of spherical aberration with respect to a C-line (a wavelength of 656.28 nm) (indicated by a one-dot dashed-line), and an amount of spherical aberration with respect to a g-line (a wavelength of 435.84 nm) (indicated by a broken line) are represented by the respective amounts of shift (unit: mm) of the focal position in the direction of optical axis AX from the paraxial image surface. The vertical axis represents values (i.e., relative pupil heights) obtained by normalizing incident heights on the pupil by the maximum height.

In the astigmatism diagram shown in FIGS. 7A to 12C, a broken line T represents a tangential image surface with respect to the d-line in terms of the amount of shift (unit: mm) of the focal position in the direction of optical axis AX from the paraxial image surface. A solid line S represents a sagittal image surface with respect to the d-line in terms of the amount of shift (unit: mm) of the focal position in the direction of optical axis AX from the paraxial image surface. The vertical axis represents an image height (IMG HT, unit: mm).

In the distortion aberration diagram in FIGS. 7A to 12C, the horizontal axis represents distortion with respect to the d-line in terms of the ratio (unit: %) of the actual image height to the ideal image height, and the vertical axis represents the image height (IMG HT, unit: mm). Note that the maximum value of image height IMG HT (i.e., a maximum image height y'max) corresponds to a half of the diagonal length of a light receiving surface SS of an imaging element SR (i.e., corresponds to a diagonal image height).

Numerical Example 1

Unit: mm

Surface Data

| Surface No. | r | d | nd | νd |
|---|---|---|---|---|
| object | infinity | infinity | | |
| 1 | 115.171 | 8.748 | 1.62041 | 60.34 |
| 2 | −956.660 | variable | | |
| 3 | 882.848 | 2.232 | 1.66672 | 48.32 |
| 4 | 33.137 | 8.621 | | |
| 5 | −141.452 | 1.983 | 1.69895 | 30.05 |
| 6 | 36.415 | 6.011 | 2.00100 | 29.13 |
| 7 | 136.441 | variable | | |
| 8 | 191.669 | 1.851 | 1.48749 | 70.44 |
| 9 | 46.727 | 4.834 | 1.84666 | 23.78 |
| 10 | 222.331 | variable | | |
| 11* | 104.983 | 4.457 | 1.58313 | 59.46 |
| 12* | −206.547 | 3.513 | | |
| 13 (stop) | infinity | 6.172 | | |
| 14 | −56.422 | 1.969 | 1.69895 | 30.05 |
| 15 | 149.044 | 8.299 | 1.49700 | 81.61 |
| 16 | −59.584 | 0.197 | | |
| 17 | 134.537 | 9.381 | 1.59282 | 68.62 |
| 18 | −57.519 | 0.197 | | |
| 19 | 53.262 | 2.101 | 1.80100 | 34.97 |
| 20 | 25.671 | 12.729 | 1.59282 | 68.62 |
| 21 | −165.367 | variable | | |
| 22* | 137.459 | 1.707 | 1.69350 | 53.20 |
| 23* | 24.234 | variable | | |
| 24 | 58.504 | 7.700 | 2.00100 | 29.13 |
| 25 | −44.490 | 1.602 | 1.69895 | 30.05 |
| 26 | 25.485 | 5.719 | 1.76200 | 40.10 |
| 27 | 72.462 | 23.376 | | |
| image | infinity | | | |

Aspheric Surface Data

| Surface No. | K | A4 | A6 | A8 | A10 |
|---|---|---|---|---|---|
| 11 | 0 | −2.0939e−006 | −4.0798e−009 | −1.5073e−011 | −6.8663e−015 |
| 12 | 0 | 2.9141e−006 | −2.8724e−009 | −1.6453e−011 | 0 |
| 22 | 0 | −4.4947e−006 | 1.5426e−008 | −5.9265e−011 | 9.9749e−014 |
| 23 | 0 | −6.5436e−006 | 1.2698e−008 | −9.7184e−011 | 1.4562e−013 |

Various Types of Data

| Zoom Ratio | | 1.91 | |
|---|---|---|---|
| | Wide | Middle | Tele |
| Fl | 33.612 | 45.956 | 64.079 |
| Fno. | 2.000 | 2.000 | 2.000 |
| ω | 22.902 | 17.171 | 12.495 |
| y'max | 14.200 | 14.200 | 14.200 |
| TL | 189.833 | 189.833 | 189.833 |
| BF | 23.376 | 23.376 | 23.376 |
| d2 | 1.818 | 20.293 | 34.481 |
| d7 | 17.900 | 9.949 | 3.572 |

-continued

| | | | |
|---|---|---|---|
| d10 | 29.229 | 15.892 | 1.895 |
| d21 | 3.282 | 4.812 | 6.166 |
| d23 | 14.205 | 15.487 | 20.318 |

Lens Group Data

| Group (Surface) | Focal Length |
|---|---|
| 1 (1-2) | 166.209 |
| 2 (3-7) | −41.162 |
| 3 (8-10) | 153.579 |
| 4 (11-21) | 39.054 |
| 5 (22-23) | −42.686 |
| 6 (24-27) | 58.840 |

Numerical Example 2

Unit: mm

Surface Data

| Surface No. | r | d | nd | vd |
|---|---|---|---|---|
| object | infinity | infinity | | |
| 1 | 123.032 | 9.372 | 1.62041 | 60.34 |
| 2 | −922.008 | variable | | |
| 3 | 1397.732 | 2.363 | 1.59282 | 68.62 |
| 4 | 32.317 | 11.218 | | |
| 5 | −158.086 | 1.983 | 1.69895 | 30.05 |
| 6 | 34.441 | 6.410 | 2.00100 | 29.13 |
| 7 | 131.774 | variable | | |
| 8 | 391.870 | 1.851 | 1.48749 | 70.44 |
| 9 | 50.530 | 4.912 | 1.84666 | 23.78 |
| 10 | 297.321 | variable | | |
| 11* | 174.448 | 4.615 | 1.58313 | 59.46 |
| 12* | −96.145 | 3.414 | | |
| 13 (stop) | infinity | 5.196 | | |
| 14 | −81.793 | 1.838 | 1.69895 | 30.05 |
| 15 | 66.471 | 10.111 | 1.49700 | 81.61 |
| 16 | −52.878 | 0.197 | | |
| 17 | 285.688 | 6.044 | 1.59282 | 68.62 |
| 18 | −77.204 | 0.197 | | |
| 19 | 85.075 | 1.969 | 1.67270 | 32.17 |
| 20 | 33.037 | 12.405 | 1.59282 | 68.62 |
| 21 | −68.424 | variable | | |
| 22 | −3258.716 | 4.067 | 1.84666 | 23.78 |
| 23 | −43.747 | 1.195 | 1.71736 | 29.50 |
| 24 | 24.924 | variable | | |
| 25 | 60.427 | 6.929 | 2.00100 | 29.13 |
| 26 | −56.938 | 2.919 | | |
| 27* | −38.507 | 1.969 | 1.80610 | 40.73 |
| 28* | −656.496 | 19.858 | | |
| image | infinity | | | |

Aspheric Surface Data

| Surface No. | K | A4 | A6 | A8 | A10 |
|---|---|---|---|---|---|
| 11 | 0 | −3.4517e−006 | 6.1976e−012 | −4.1754e−013 | −6.9770e−016 |
| 12 | 0 | 2.9317e−006 | 1.0498e−009 | 1.3788e−013 | 0 |
| 27 | 0 | −9.6138e−007 | 3.6470e−008 | −8.3787e−011 | 6.8409e−014 |
| 28 | 0 | −6.8467e−006 | 3.6554e−008 | −8.8098e−011 | 8.8328e−014 |

Various Types of data

| Zoom Ratio | 1.91 | | |
|---|---|---|---|
| | Wide | Middle | Tele |
| Fl | 33.616 | 45.952 | 64.078 |
| Fno. | 2.000 | 2.000 | 2.000 |
| ω | 22.900 | 17.172 | 12.495 |
| y'max | 14.200 | 14.200 | 14.200 |
| TL | 189.825 | 189.825 | 189.825 |

-continued

| | | | |
|---|---|---|---|
| BF | 19.858 | 19.858 | 19.858 |
| d2 | 1.843 | 21.484 | 36.815 |
| d7 | 25.904 | 14.335 | 4.011 |
| d10 | 22.373 | 12.132 | 2.187 |
| d21 | 3.279 | 4.613 | 5.808 |
| d24 | 15.392 | 16.227 | 19.970 |

| Lens Group Data | |
|---|---|
| Group (Surface) | Focal Length |
| 1 (1-2) | 175.564 |
| 2 (3-7) | −45.296 |
| 3 (8-10) | 179.819 |
| 4 (11-21) | 37.187 |
| 5 (22-24) | −38.392 |
| 6 (25-28) | 60.801 |

Numerical Example 3

| Unit: mm | | | | |
|---|---|---|---|---|
| Surface Data | | | | |
| Surface No. | r | d | nd | vd |
| object | infinity | infinity | | |
| 1 | 101.807 | 9.145 | 1.58913 | 61.25 |
| 2 | −1261.681 | variable | | |
| 3 | 955.511 | 2.101 | 1.80610 | 40.73 |
| 4 | 35.732 | 9.244 | | |
| 5 | −286.128 | 1.851 | 1.68893 | 31.16 |
| 6 | 34.704 | 5.507 | 2.00100 | 29.13 |
| 7 | 99.749 | variable | | |
| 8 | 317.133 | 1.720 | 1.48749 | 70.44 |
| 9 | 47.002 | 5.021 | 1.84666 | 23.78 |
| 10 | 455.880 | variable | | |
| 11* | 244.645 | 4.611 | 1.58313 | 59.46 |
| 12* | −83.754 | 3.151 | | |
| 13 (stop) | infinity | 6.952 | | |
| 14 | −44.906 | 1.969 | 1.64769 | 33.84 |
| 15 | 124.483 | 8.780 | 1.49700 | 81.61 |
| 16 | −49.727 | 0.197 | | |
| 17 | 256.443 | 8.112 | 1.59282 | 68.62 |
| 18 | −52.284 | 0.197 | | |
| 19 | 88.222 | 1.969 | 1.71736 | 29.50 |
| 20 | 30.942 | 11.872 | 1.59282 | 68.62 |
| 21 | −107.803 | variable | | |
| 22 | 519.548 | 2.733 | 1.84666 | 23.78 |
| 23 | −131.294 | 1.195 | 1.58144 | 40.89 |
| 24 | 25.935 | variable | | |
| 25 | 44.571 | 6.956 | 1.80610 | 40.73 |
| 26 | −51.731 | 2.065 | | |
| 27 | −48.333 | 1.444 | 1.65844 | 50.85 |
| 28 | 71.489 | 22.900 | | |
| image | infinity | | | |

| Aspheric Surface Data | | | | | |
|---|---|---|---|---|---|
| Surface No. | K | A4 | A6 | A8 | A10 |
| 11 | 0 | −3.5961e−006 | 2.9811e−009 | −1.4360e−012 | −8.3685e−016 |
| 12 | 0 | 2.2997e−006 | 4.6753e−009 | 0 | 0 |

| Various Types of Data | | | |
|---|---|---|---|
| Zoom Ratio | | 1.91 | |
| | Wide | Middle | Tele |
| Fl | 33.613 | 45.949 | 64.071 |
| Fno. | 2.000 | 2.000 | 2.000 |
| ω | 22.902 | 17.173 | 12.496 |
| y'max | 14.200 | 14.200 | 14.200 |

-continued

| | | | |
|---|---|---|---|
| TL | 189.302 | 189.302 | 189.302 |
| BF | 22.900 | 22.900 | 22.900 |
| d2 | 1.926 | 21.352 | 36.146 |
| d7 | 16.470 | 9.584 | 4.224 |
| d10 | 30.782 | 16.672 | 2.199 |
| d21 | 3.544 | 5.306 | 6.393 |
| d24 | 16.886 | 16.694 | 20.648 |

Lens Group Data

| Group (Surface) | Focal Length |
|---|---|
| 1 (1-2) | 160.304 |
| 2 (3-7) | −38.116 |
| 3 (8-10) | 135.912 |
| 4 (11-21) | 40.728 |
| 5 (22-24) | −53.596 |
| 6 (25-28) | 76.669 |

Numerical Example 4

Unit: mm

Surface Data

| Surface No. | r | d | nd | vd |
|---|---|---|---|---|
| object | infinity | infinity | | |
| 1 | 107.991 | 8.619 | 1.62041 | 60.34 |
| 2 | −1158.126 | variable | | |
| 3 | 889.021 | 2.101 | 1.83400 | 37.16 |
| 4 | 36.824 | 7.223 | | |
| 5 | −131.793 | 1.851 | 1.70154 | 41.24 |
| 6 | 38.515 | 5.237 | 2.00100 | 29.13 |
| 7 | 129.524 | variable | | |
| 8 | 96.125 | 1.851 | 1.48749 | 70.44 |
| 9 | 43.805 | 4.794 | 1.84666 | 23.78 |
| 10 | 161.329 | variable | | |
| 11* | 91.643 | 4.894 | 1.58313 | 59.46 |
| 12* | −353.919 | 3.757 | | |
| 13 (stop) | infinity | 6.423 | | |
| 14 | −52.187 | 1.969 | 1.72825 | 28.32 |
| 15 | 119.326 | 8.840 | 1.49700 | 81.61 |
| 16 | −56.373 | 0.197 | | |
| 17 | 136.023 | 9.582 | 1.59282 | 68.62 |
| 18 | −57.624 | 0.197 | | |
| 19 | 47.308 | 2.101 | 1.83400 | 37.16 |
| 20 | 25.599 | 13.117 | 1.59282 | 68.62 |
| 21 | −275.086 | variable | | |
| 22* | 97.414 | 1.707 | 1.69350 | 53.20 |
| 23* | 24.661 | variable | | |
| 24 | 68.746 | 6.339 | 1.95375 | 32.32 |
| 25 | −62.637 | 1.503 | | |
| 26 | −81.643 | 1.589 | 1.67270 | 32.17 |
| 27 | 25.034 | 5.318 | 1.91082 | 35.25 |
| 28 | 55.154 | 23.665 | | |
| image | infinity | | | |

Aspheric Surface Data

| Surface No. | K | A4 | A6 | A8 | A10 |
|---|---|---|---|---|---|
| 11 | 0 | −2.2417e−006 | −5.0207e−009 | −1.3180e−011 | −1.1676e−014 |
| 12 | 0 | 2.4469e−006 | −3.4189e−009 | −1.7640e−011 | 0 |
| 22 | 0 | −4.7516e−006 | 7.5805e−009 | −3.3917e−011 | 5.2583e−014 |
| 23 | 0 | −5.9451e−006 | 5.7516e−010 | −4.1954e−011 | 8.3172e−015 |

-continued

| Various Types of Data |||||
| --- | --- | --- | --- | --- |
| Zoom Ratio |||| 1.91 |
| | | Wide | Middle | Tele |
| Fl | | 33.610 | 45.951 | 64.071 |
| Fno. | | 2.000 | 2.000 | 2.000 |
| ω | | 22.904 | 17.172 | 12.496 |
| y'max | | 14.200 | 14.200 | 14.200 |
| TL | | 189.825 | 189.825 | 189.825 |
| BF | | 23.665 | 23.665 | 23.665 |
| d2 | | 4.889 | 22.111 | 34.590 |
| d7 | | 17.077 | 9.097 | 2.873 |
| d10 | | 26.204 | 14.470 | 1.961 |
| d21 | | 3.282 | 5.852 | 8.456 |
| d23 | | 15.499 | 15.422 | 19.071 |
| Lens Group Data |||||
| | Group (Surface) | | Focal Length ||
| | 1 (1-2) | | 159.633 ||
| | 2 (3-7) | | −35.514 ||
| | 3 (8-10) | | 122.187 ||
| | 4 (11-21) | | 40.678 ||
| | 5 (22-23) | | −48.076 ||
| | 6 (24-28) | | 62.502 ||

Numerical Example 5

| Unit: mm |||||
| --- | --- | --- | --- | --- |
| Surface Data |||||
| Surface No. | r | d | nd | vd |
| object | infinity | infinity | | |
| 1 | 95.747 | 9.093 | 1.62041 | 60.34 |
| 2 | −4231.234 | variable | | |
| 3 | 389.905 | 2.101 | 1.83400 | 37.16 |
| 4 | 36.958 | 9.285 | | |
| 5 | −137.547 | 1.851 | 1.80610 | 40.73 |
| 6 | 38.210 | 5.269 | 2.00100 | 29.13 |
| 7 | 130.771 | variable | | |
| 8 | 94.430 | 1.851 | 1.48749 | 70.44 |
| 9 | 44.748 | 4.691 | 1.84666 | 23.78 |
| 10 | 165.891 | variable | | |
| 11* | 80.459 | 4.627 | 1.58313 | 59.46 |
| 12* | −528.861 | 3.907 | | |
| 13 (stop) | infinity | 6.373 | | |
| 14 | −53.306 | 1.969 | 1.72825 | 28.32 |
| 15 | 164.124 | 8.447 | 1.49700 | 81.61 |
| 16 | −55.829 | 0.197 | | |
| 17 | 179.277 | 9.341 | 1.59282 | 68.62 |
| 18 | −55.097 | 0.197 | | |
| 19 | 48.859 | 2.101 | 1.80100 | 34.97 |
| 20 | 25.861 | 13.177 | 1.59282 | 68.62 |
| 21 | −242.253 | variable | | |
| 22* | 102.358 | 1.707 | 1.69350 | 53.20 |
| 23* | 24.648 | variable | | |
| 24 | 52.182 | 6.491 | 1.95375 | 32.32 |
| 25 | −70.683 | 1.647 | | |
| 26 | −85.480 | 1.589 | 1.68893 | 31.16 |
| 27 | 28.361 | 4.253 | 1.91082 | 35.25 |
| 28 | 49.868 | 23.499 | | |
| image | infinity | | | |
| Aspheric Surface Data |||||
| Surface No. | K | A4 | A6 | A8 | A10 |
| 11 | 0 | −1.8732e−006 | −5.1904e−009 | −2.0546e−011 | −2.0037e−014 |
| 12 | 0 | 3.3028e−006 | −2.7258e−009 | −2.9138e−011 | 0 |

-continued

| | | | | | |
|---|---|---|---|---|---|
| 22 | 0 | −1.8064e−006 | −5.9294e−010 | −1.3208e−011 | 2.6206e−014 |
| 23 | 0 | −2.7807e−006 | −6.4726e−009 | −1.8245e−011 | −2.7772e−014 |

Various Types of Data

| Zoom Ratio | | 2.07 | |
|---|---|---|---|
| | Wide | Middle | Tele |
| Fl | 30.984 | 44.639 | 64.072 |
| Fno. | 2.000 | 2.000 | 2.000 |
| ω | 24.622 | 17.646 | 12.496 |
| y'max | 14.200 | 14.200 | 14.200 |
| TL | 189.824 | 189.824 | 189.824 |
| BF | 23.499 | 23.499 | 23.499 |
| d2 | 4.121 | 22.578 | 34.261 |
| d7 | 15.948 | 8.302 | 2.838 |
| d10 | 29.619 | 15.507 | 1.742 |
| d21 | 3.282 | 6.117 | 8.993 |
| d23 | 13.191 | 13.657 | 18.326 |

Lens Group Data

| Group (Surface) | Focal Length |
|---|---|
| 1 (1-2) | 151.035 |
| 2 (3-7) | −32.410 |
| 3 (8-10) | 121.406 |
| 4 (11-21) | 39.939 |
| 5 (22-23) | −47.240 |
| 6 (24-28) | 62.525 |

Numerical Example 6

Unit: mm

Surface Data

| Surface No. | r | d | nd | vd |
|---|---|---|---|---|
| object | infinity | infinity | | |
| 1 | 104.086 | 9.346 | 1.62041 | 60.34 |
| 2 | −1693.448 | variable | | |
| 3 | 2111.147 | 2.101 | 1.74400 | 44.79 |
| 4 | 35.047 | 10.022 | | |
| 5 | −169.569 | 1.851 | 1.68893 | 31.16 |
| 6 | 35.546 | 5.457 | 2.00100 | 29.13 |
| 7 | 108.511 | variable | | |
| 8 | 1000.462 | 1.851 | 1.48749 | 70.44 |
| 9 | 53.365 | 5.146 | 1.84666 | 23.78 |
| 10 | −1791.416 | variable | | |
| 11* | 217.282 | 4.583 | 1.58313 | 59.46 |
| 12* | −89.438 | 4.054 | | |
| 13 (stop) | infinity | 5.568 | | |
| 14 | −70.150 | 1.969 | 1.68893 | 31.16 |
| 15 | 124.707 | 7.654 | 1.49700 | 81.61 |
| 16 | −64.074 | 0.197 | | |
| 17 | 184.397 | 7.095 | 1.59282 | 68.62 |
| 18 | −62.571 | 0.197 | | |
| 19 | 168.047 | 1.969 | 1.68893 | 31.16 |
| 20 | 32.579 | 12.419 | 1.59282 | 68.62 |
| 21 | −69.651 | variable | | |
| 22 | 952.736 | 3.421 | 1.84666 | 23.78 |
| 23 | −68.791 | 1.195 | 1.68893 | 31.16 |
| 24 | 28.192 | variable | | |
| 25 | 48.893 | 6.964 | 2.00100 | 29.13 |
| 26 | −63.709 | 2.284 | | |

-continued

| | | | | | |
|---|---|---|---|---|---|
| 27 | −54.418 | 1.576 | | 1.72825 | 28.32 |
| 28 | 83.512 | 22.823 | | | |
| image | infinity | | | | |

Aspheric Surface Data

| Surface No. | K | A4 | A6 | A8 | A10 |
|---|---|---|---|---|---|
| 11 | 0 | −3.5975e−006 | 1.6347e−009 | −4.1326e−014 | −1.8335e−015 |
| 12 | 0 | 2.3178e−006 | 3.2314e−009 | 0 | 0 |

Various Types of Data

| Zoom Ratio | | 1.91 | |
|---|---|---|---|
| | Wide | Middle | Tele |
| Fl | 33.614 | 45.952 | 64.073 |
| Fno. | 2.000 | 2.000 | 2.000 |
| ω | 22.901 | 17.172 | 12.496 |
| y'max | 14.200 | 14.200 | 14.200 |
| TL | 189.827 | 189.827 | 189.827 |
| BF | 22.823 | 22.823 | 22.823 |
| d2 | 2.112 | 21.525 | 36.529 |
| d7 | 17.522 | 10.320 | 4.401 |
| d10 | 29.200 | 15.578 | 1.745 |
| d21 | 3.543 | 5.381 | 6.828 |
| d24 | 17.708 | 17.280 | 20.582 |

Lens Group Data

| Group (Surface) | Focal Length |
|---|---|
| 1 (1-2) | 158.370 |
| 2 (3-7) | −37.448 |
| 3 (8-10) | 130.267 |
| 4 (11-21) | 41.470 |
| 5 (22-24) | −47.250 |
| 6 (25-28) | 60.618 |

Table 1 shows numerical values in each of Examples. Table 2 shows values corresponding to the conditional formulae in each of Examples.

TABLE 1

| | Example 1 | Example 2 | Example 3 | Example 4 | Example 5 | Example 6 |
|---|---|---|---|---|---|---|
| ft | 64.079 | 64.078 | 64.071 | 64.071 | 64.072 | 64.073 |
| f1 | 166.209 | 175.564 | 160.304 | 159.633 | 151.035 | 158.370 |
| f3 | 153.579 | 179.819 | 135.912 | 122.187 | 121.406 | 130.267 |
| f4 | 39.054 | 37.187 | 40.728 | 40.678 | 39.939 | 41.470 |
| f5 | −42.686 | −38.392 | −53.596 | −48.076 | −47.240 | −47.250 |
| f6 | 58.840 | 60.801 | 76.669 | 62.502 | 62.525 | 60.618 |
| nd2p | 2.00100 | 2.00100 | 2.00100 | 2.00100 | 2.00100 | 2.00100 |
| nd2n | 1.69895 | 1.69895 | 1.69893 | 1.70154 | 1.80610 | 1.69893 |

TABLE 2

| | Example 1 | Example 2 | Example 3 | Example 4 | Example 5 | Example 6 |
|---|---|---|---|---|---|---|
| Formula (1) | | | | | | |
| Lens L4c | 81.61 | 81.61 | 81.61 | 81.61 | 81.61 | 81.61 |
| Lens L4d | 68.62 | 68.62 | 68.62 | 68.62 | 68.62 | 68.62 |
| Lens L4f | 68.62 | 68.62 | 68.62 | 68.62 | 68.62 | 68.62 |
| Formula (2) | 2.397 | 2.806 | 2.121 | 1.907 | 1.895 | 2.033 |
| Formula (3) | 0.609 | 0.580 | 0.636 | 0.635 | 0.623 | 0.647 |
| Formula (4) | 0.302 | 0.302 | 0.312 | 0.299 | 0.195 | 0.312 |

TABLE 2-continued

|  | Example 1 | Example 2 | Example 3 | Example 4 | Example 5 | Example 6 |
|---|---|---|---|---|---|---|
| Formula (5) | 0.235 | 0.212 | 0.254 | 0.255 | 0.264 | 0.262 |
| Formula (6) | −0.725 | −0.631 | −0.699 | −0.769 | −0.756 | −0.799 |
| Formula (7) | 2.594 | 2.740 | 2.502 | 2.492 | 2.357 | 2.472 |

Figure 13:
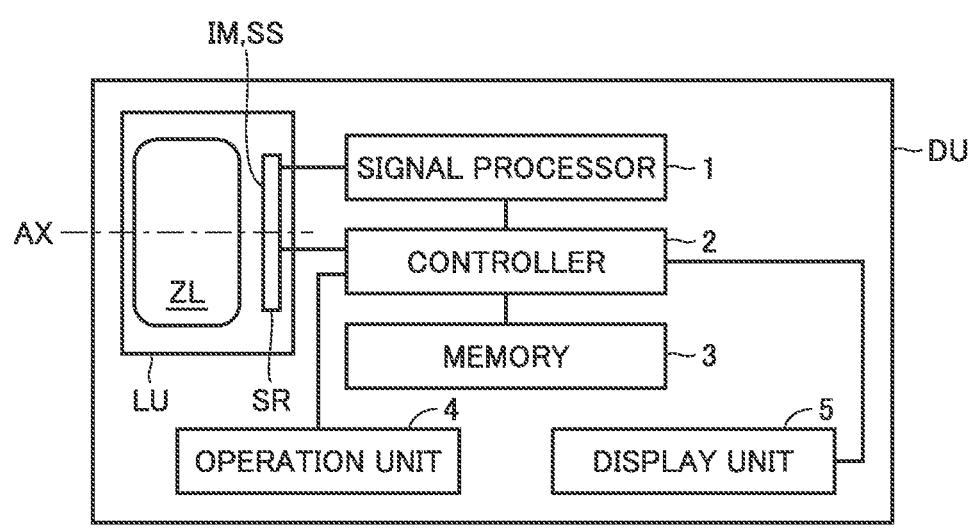
FIG. 13 is a schematic configuration diagram of: an imaging optical device including a zoom lens according to a present embodiment; and a digital apparatus.

FIG. 13 is a schematic configuration diagram of: an imaging optical device LU including zoom lens ZL according to the present embodiment; and a digital apparatus DU. As shown in FIG. 13, digital apparatus DU includes imaging optical device LU. Imaging optical device LU includes, in order from the side of an object (i.e., a subject to be imaged): a zoom lens ZL (AX represents an optical axis) that forms an optical image (image surface IM) of the object; and an imaging element SR that converts the optical image formed on a light receiving surface (imaging surface) SS by zoom lens ZL into an electrical signal. As required, a parallel plane plate (for example, a cover glass of imaging element SR, which corresponds to an optical filter such as an optical low-pass filter or an infrared cut filter that is arranged as required) may be disposed on imaging optical device LU.

Examples of imaging element SR may be a solid-state imaging element such as a charge coupled device (CCD)-type image sensor having a plurality of pixels or a complementary metal-oxide semiconductor (CMOS)-type image sensor. Zoom lens ZL is provided such that an optical image of a subject is formed on light receiving surface SS serving as a photoelectric conversion unit of imaging element SR. The optical image formed by zoom lens ZL is converted by imaging element SR into an electrical signal.

In addition to imaging optical device LU, digital apparatus DU includes a signal processor 1, a controller 2, a memory 3, an operation unit 4, and a display unit 5. Signal processor 1 subjects the signal generated by imaging element SR to processing such as prescribed digital image processing or image compression processing as required, to thereby generate a digital video signal. The digital video signal is recorded in memory 3 (a semiconductor memory, an optical disc, and the like). The digital video signal may be transmitted to another device.

Controller 2 is formed of a microcomputer and intensively controls functions such as an image capturing function (a still image capturing function, a moving image capturing function, and the like), and an image reproducing function, and also controls a lens moving mechanism for zooming, focusing, image stabilizing correction, and the like. For example, controller 2 controls imaging optical device LU to perform at least one of capturing of a still image of a subject and capturing of a moving image of a subject.

Display unit 5 includes a display such as a liquid crystal monitor, and displays an image using an image signal converted by imaging element SR or image information recorded in memory 3. Operation unit 4 includes an operation member such as an operation button (for example, a release button) and an operation dial (for example, an image capturing mode dial), and transmits the information input by an operator to controller 2.

Although embodiments of the present invention have been described and illustrated in detail, the disclosed embodiments are made for purposes of illustration and example only and not limitation. The scope of the present invention should be interpreted by terms of the appended claims.

What is claimed is:

1. A zoom lens comprising, in order from an object side to an image surface side:
a first lens group having positive power;
a second lens group having negative power;
a third lens group having positive power;
a fourth lens group having positive power;
a fifth lens group having negative power; and
a sixth lens group having positive power, wherein
during zooming, a distance between two adjacent lens groups changes, the two adjacent lens groups being selected from among the first lens group, the second lens group, the third lens group, the fourth lens group, the fifth lens group, and the sixth lens group,
the fourth lens group includes at least one positive lens that satisfies the following conditional formula (1), and
the following conditional formulae (2), (3), and (5) are satisfied:

$$vdp \geq 65 \tag{1},$$

$$1.19 \leq f3/ft \leq 4.15 \tag{2},$$

$$0.51 \leq f4/ft \leq 1.50 \tag{3, and}$$

$$0.1 \leq f4/f1 \leq 0.4 \tag{5},$$

where
vdp: an Abbe number of the at least one positive lens in the fourth lens group with respect to a d-line,
ft: a focal length of an entire system at a telephoto end,
f1: a focal length of the first lens group
f3: a focal length of the third lens group, and
f4: a focal length of the fourth lens group.

2. The zoom lens according to claim 1, wherein
the second lens group includes at least one cemented lens satisfying the following conditional formula (4):

$$nd2p - nd2n \geq 0.1 \tag{4}$$

where
nd2p: a refractive index of a positive lens included in the at least one cemented lens in the second lens group with respect to the d-line, and
nd2n: a refractive index of a negative lens included in the at least one cemented lens in the second lens group with respect to the d-line.

3. The zoom lens according to claim 1, wherein
during focusing from a far-distance object to a near-distance object, the fifth lens group moves on an optical axis, and
the following conditional formula (6) is satisfied:

$$-3.5 \leq f5/f6 \leq -0.5 \tag{6}$$

where
f5: a focal length of the fifth lens group, and
f6: a focal length of the sixth lens group.

4. The zoom lens according to claim 1, wherein
the following conditional formula (7) is satisfied:

$$1.5 \leq f1/ft \leq 10 \tag{7}$$

where f1: a focal length of the first lens group.

5. The zoom lens according to claim 1, wherein the first lens group consists of one positive lens.

6. An imaging optical device comprising:
the zoom lens according to claim 1; and
an imaging element that converts an optical image formed on a light receiving surface of the imaging element into an electrical signal, wherein
the zoom lens is provided to form an optical image of a subject on the light receiving surface of the imaging element.

7. A digital apparatus comprising:
the imaging optical device according to claim 6, wherein
the digital apparatus has at least one of a function of capturing a still image of the subject or a function of capturing a moving image of the subject.

* * * * *